US012504865B2

(12) United States Patent
Singh et al.

(10) Patent No.: US 12,504,865 B2
(45) Date of Patent: Dec. 23, 2025

(54) SYSTEMS AND METHODS FOR GENERATING AN AVATAR COLLAGE BASED ON SOCIAL NETWORK ITEMS

(71) Applicant: Adeia Guides Inc., San Jose, CA (US)

(72) Inventors: Gyanveer Singh, Bangalore (IN); Bharat Verma, Bengaluru Karnataka (IN); Dhananjay Lal, Englewood, CO (US); Reda Harb, Tampa, FL (US); Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 231 days.

(21) Appl. No.: 18/510,281

(22) Filed: Nov. 15, 2023

(65) Prior Publication Data

US 2025/0156038 A1 May 15, 2025

(51) Int. Cl.

*G06F 3/0484* (2022.01)
*G06F 3/04812* (2022.01)
*G06F 16/9536* (2019.01)
*G06Q 50/00* (2024.01)

(52) U.S. Cl.

CPC ........ *G06F 3/0484* (2013.01); *G06F 16/9536* (2019.01); *G06F 3/04812* (2013.01); *G06Q 50/01* (2013.01)

(58) Field of Classification Search

CPC ............... G06F 3/0484; G06F 16/9536; G06F 3/04812; G06F 3/0482; G06Q 50/01

See application file for complete search history.

(56) References Cited

U.S. PATENT DOCUMENTS

| | | | | |
|---|---|---|---|---|
| 8,775,517 | B1 * | 7/2014 | Goldman | G06F 16/951 709/204 |
| 9,742,615 | B1 * | 8/2017 | Wick | H04L 67/306 |
| 2013/0084978 | A1 * | 4/2013 | Olomskiy | A63F 13/87 463/31 |
| 2013/0097257 | A1 * | 4/2013 | Jorakuji | H04N 21/2543 709/206 |
| 2013/0151603 | A1 * | 6/2013 | Lobb | A63F 13/795 709/204 |
| 2014/0136546 | A1 * | 5/2014 | Satalkar | G06F 16/9535 707/769 |
| 2015/0120845 | A1 * | 4/2015 | McClard | H04L 51/224 709/206 |
| 2016/0004413 | A1 * | 1/2016 | Leydon | G07F 17/3244 715/838 |
| 2018/0287981 | A1 * | 10/2018 | Leiba | G06Q 50/01 |
| 2021/0073673 | A1 * | 3/2021 | Janakiraman | G06V 30/1916 |

* cited by examiner

*Primary Examiner* — Daniel W Parcher

(74) *Attorney, Agent, or Firm* — HALEY GUILIANO LLP

(57) ABSTRACT

Systems and methods are provided for generating an avatar collage based on a plurality of social network items posted by a plurality of social network accounts. A social network application identifies a plurality of social network items. The social network application determines a topic that is common to each social network item of the plurality of social network items. The social network application generates an avatar collage based on the plurality of social network items. The avatar collage comprises a plurality of avatar representations of the plurality of social network accounts that posted the plurality of social network items and at least one text portion of a particular social network item of the plurality of social network items.

16 Claims, 17 Drawing Sheets

SYSTEMS AND METHODS FOR GENERATING AN AVATAR COLLAGE BASED ON SOCIAL NETWORK ITEMS

BACKGROUND

This disclosure relates to systems and methods for generating an avatar collage based on social network items with a common topic.

SUMMARY

Social networks provide many ways for devices associated with social network accounts to communicate with each other. For example, devices associated with social network accounts may submit social network items to the social network server. For example, devices associated with social network accounts leave comments on a post to share their views, greetings, wishes, and thoughts. The social network server aggregates such social network items from devices and makes them privately or publicly available to other devices. For example, social network items submitted by friend accounts may be aggregated by the social network server and generated for display for a device that later logs in to the social network (e.g., as a "wall" or another list of items).

However, the social network's servers must use limited network bandwidth for providing aggregated social network items to devices of social network accounts. Moreover, devices of social network accounts will often have limited space for displaying user interfaces of the social network. Consequently, the social networks servers constantly face the need to consider UI space limits when causing a display of the social network items (e.g., posts or comments). If there are many social network items to be transmitted for display by the social network server, or social network items that have a high word count, the social network server may struggle to present the social network items in a user interface that is easily read by users of social network accounts. If large amounts of social network items are sent by the social network server for display on a device with a small screen, the user interface management of the large amounts of social network items becomes cumbersome. For example, the user interface will then need to manage various elements for scrolling, complicating the navigation. The need to interact with various scrolling elements before navigating to all social network items further degrades the performance of the user interface of the social network.

In one approach, a social network server groups together social network items into a thread. A set of social network servers perform the functions of the social network. A thread is a group of social network items that are connected via related social network items. A social network server may receive a selection of one post of a thread from a social network account and, in response, unveil the other posts within that thread. A social network server may also piece together posts made by the social network account that made the initial post, so users do not have to see all the reply comments. In another approach, a social network server allows users of social network accounts to incorporate images, GIFs, and other visual aids to their posts and comments. The social network server intends for these visual aids to make comments more easily read by users of the social network.

These approaches are deficient because the social network server still must use a plethora of bandwidth and user interface space when displaying the entirety of the comments left on a post. Instead, once a thread or post is selected, all the comments are displayed, taking up much user interface space. The social network server may require extra scrolling from a user interface to display all the comments, which is an inefficient use of time and leaves room for more user interface input mistakes. Moreover, users of social network accounts may still be overwhelmed by the number of comments and feel discouraged from reading the comments or engaging with the comments and/or post. Accordingly, there is a need for social network servers and user interfaces that provide concise visual summaries of social network posts in a manner that prevents excess bandwidth usage and is convenient for users of a social network.

To address these problems, in some embodiments, a social network system (SNS) leverages data from a plurality of social network items posted to a social network by a plurality of social network accounts. In some approaches, the SNS comprises all social network servers of the respective social network. Social network items may be posts made to a social network, replies to an initial social network post, reposts of an initial social network post, a collaborative post, a status post, any other suitable item, or any combination thereof. A social network (e.g., Facenet) identifies social network items (e.g., comments) made in response to an initial social network item. For example, in some embodiments, servers of Facenet receive social network items posted by devices signed in to Facenet accounts. Facenet aggregates social network items and generates for display the aggregated social network items for devices signed in to Facenet accounts. For example, the SNS receives comments from devices associated with social network accounts of John, Arnab, Ritika, and Jagat (e.g., several Facenet accounts) posted in response to a status post from a device associated with Amit's social network account declaring that it is Amit's birthday (e.g., an initial social network item from a Facenet account). The items may include text, audio, visual aids, any other suitable content, or any combination thereof.

In some embodiments, the SNS identifies a topic that is common to each social network item of the plurality of social network items. For example, the SNS analyzes the Facenet comments by inputting the Facenet comments into a neural network that is trained in pattern recognition. For example, the SNS determines that the Facenet comments from devices associated with social network accounts of John, Arnab, Ritika, and Jagat are all in response to Amit's birthday, thus the SNS determines that the topic of the comments is "birthday" and is related to the social network account associated with "Amit." In some embodiments, the SNS determines a lexical complexity for each of the social network items. For example, the SNS performs semantic and contextual analysis of the Facenet comments from devices associated with social network accounts of John, Arnab, Ritika, and Jagat. Such aspects allow for the SNS to determine whether to proceed in generating an avatar collage based on the social network items, which in turn saves the SNS user interface space.

In some embodiments, if the SNS determines that the lexical complexity of the social network items is below a threshold lexical complexity, the SNS generates a plurality of avatar representations of the social network accounts that are associated with devices that posted the social network items. For example, the SNS generates avatar representations for John, Arnab, Ritika, and Jagat based on data from their respective social network accounts. The SNS may generate each avatar representation based on a determined tone of each respective social network item. For example, the SNS determines that John's Facenet comment is joyful, thus the SNS generates an avatar representation with a smile for John's social network account. In some embodiments, the SNS generates an avatar representation using an actual photograph of the user associated with the social network account. For example, the SNS generates an avatar of Ritika using a photograph posted to Ritika's Facenet account which identifies a person in the photograph as Ritika.

Such aspects allow the SNS to save the social network user interface space and bandwidth. Avatar representations generally take up less user interface than a plurality of social network items represented as text. The expressions of the avatar representations based on the tone of a social network item allows the SNS to efficiently communicate the essence of a social network item to social network accounts of the social network. In some embodiments, the SNS uses less bandwidth generating for display an avatar representation with a smiling expression than generating for display a large block of text. For example, the plurality of avatar representations may be stored on the user device logged in to the social network application, thus displaying the plurality of avatar representations takes the SNS less bandwidth than generating for display the text of, e.g., hundreds of comments. In another example, the SNS instructs the user device logged in to the social network application to generate a plurality of avatar representations for a thread of hundreds of comments. The SNS uses less bandwidth generating a few avatar representations than generating for display the text of hundreds of comments.

In some embodiments, the SNS generates at least one text portion of a particular social network item. The SNS may determine the particular social network item by determining which respective social network account has the smallest degree of separation from the social network account that posted the initial social network item. For example, the SNS generates the comment from a device associated with John's Facenet account because the SNS determines that John's Facenet account has a smaller degree of separation to Amit's Facenet account than the other Facenet accounts associated with devices that posted comments. In some embodiments, the SNS determines the particular social network item based on the number of likes each social network item receives. For example, the SNS determines that the comment posted by a device associated with John's Facenet account has ten likes while the other comments posted by devices associated with other Facenet accounts only have three likes. Thus, the SNS generates the text from the comment posted by a device associated with John's Facenet account.

In some embodiments, the SNS replaces the display of the social network items with a display of the avatar collage. For example, the SNS replaces the display of the comments from devices associated with John, Arnab, Ritika, and Jagat's Facenet accounts with an avatar collage based on avatar representations of John, Arnab, Ritika, and Jagat and the text from John's, Arnab's, Ritika's and Jagat's Facenet comments. In some approaches, the SNS replaces the display of the social network items when the number of social network items is above a threshold number of social network items. Such aspects allow for the SNS to use less user interface space, as an avatar collage takes up less user interface space than a number of social network items above the threshold number. Such aspects save the SNS bandwidth by only generating the text of the social network item that a certain social network account requests, rather than generating the text of each social network item. Some social network items may be repetitive and/or redundant; thus, the SNS reduces the amount of text generated for display to reduce the amount of user interface space used and bandwidth used. Such aspects also allow for the user interface of the SNS to be navigated without additional scrolling via a user interface. In some approaches, the SNS replaces the display of the social network items with the avatar collage if the device on which the social network items are displayed is of a certain type (e.g., mobile phone). For example, a mobile phone has a smaller screen size, and thus a smaller amount of user interface space available for displaying the social network items, than, e.g., a laptop.

In some implementations, the lexical complexity is determined via a neural network. For example, the neural network run by the SNS does not detect a pattern from the social network items, thus the SNS does not attempt to generate an avatar collage, since the social network items are not related. In another example, the neural network detects a lexical complexity above a threshold lexical complexity, thus the SNS does not attempt to generate an avatar collage. A high lexical complexity means the social network items are complex in subject matter, thus a visual representation of the social network items is not appropriate.

In some implementations, the SNS generates the at least one text portion of the particular social network item for a first period of time. At the end of the first period of time, the SNS generates at least one text portion of another social network item for a second period of time. For example, the SNS generates the text of the comment from a device associated with John's Facenet account for five seconds, then generates the text of the comment from a device associated with Ritika's Facenet account for four seconds. The first period of time and the second period of time may be the same duration. In some embodiments, the first period of time and the second period of time are predetermined by the SNS, while in other embodiments, the first period of time and the second period of time are predetermined by a user interface selection of a duration(s). In some embodiments, the SNS generates at least one text portion of each of the social network items for a period of time.

In some approaches, the SNS generates at least one text portion of a social network item in response to receiving a user interface interaction at a respective avatar representation. In some embodiments, a user interface interaction is a touch at a portion of a touchscreen that is displaying the avatar representation on a device. For example, the SNS receives an indication of a touch at the portion of a touchscreen displaying the avatar representation of John's Facenet account, and in response the SNS generates the text of the comment from a device associated with John's Facenet account next to the avatar representation of John's Facenet account. In some embodiments, the user interface interaction is a cursor hovering over a portion of a display screen displaying the avatar representation on a device. For example, when the SNS receives an indication of a cursor hovering over the avatar representation of Ritika's Facenet account, the SNS generates the text of the comment from a device associated with Ritika's Facenet account next to the avatar representation of Ritika's Facenet account.

In some embodiments, the SNS uses a generative artificial intelligence (AI) model to create an avatar collage of the avatar representations and the at least one text portion of the particular social network item. The generative AI model may analyze the plurality of social network accounts, the plurality of social network items, the initial social network item, the initial social network account, and the content of the plurality of social network items. The generative AI model then uses this analysis to generate an avatar collage.

In some embodiments, the SNS selects a template of a plurality of templates to generate an avatar collage of the avatar representations and the at least one text portion of the particular social network item. A template includes a background based on the identified topic, an arrangement of the avatar representations, and/or other graphics related to the identified topics and/or avatar representations. For example, the SNS selects a birthday template for the Facenet comments made on the social network item created by a device associated with Amit's Facenet account. This birthday template has the avatar representations surrounding a graphic that is birthday-themed. In some embodiments, the SNS generates an image of an object proximate to the avatar representations. In some embodiments, the object is referenced in the content of at least one of the social network posts. For example, the comment received from a device associated with Jagat's Facenet account mentions "a drink," so the SNS includes a graphic of two beverages next to Jagat's and Amit's avatar representations.

In some approaches, the SNS arranges the plurality of avatar representations based on a degree of separation between respective social network accounts of the plurality of social network accounts and the social network account that posted the initial social network item. The degree of separation may be defined by the social network. For example, based on data from their respective Facenet accounts, the SNS determines that Ritika is Amit's wife, which constitutes a small degree of separation. Thus, the SNS displays the avatar representation of Ritika's Facenet account next to the avatar representation of Amit's Facenet account. In contrast, the SNS determines that Jagat and Amit are coworkers, which constitutes a larger degree of separation. Thus, the SNS displays the avatar representation of Jagat's Facenet account farther away from the avatar representation of Amit's Facenet account.

In some approaches, the SNS arranges the plurality of avatar representations based on a degree of separation between each respective social network account of the plurality of social network accounts themselves. For example, based on data from their respective Facenet accounts, the SNS determines that Arnab and John are best friends. Thus, the SNS displays the avatar representation of Arnab's Facenet account next to the avatar representation of John's Facenet account. Such aspects allow the SNS to communicate more information (e.g., relationship strength) to social network accounts than simply displaying the text of the social network items.

In some embodiments, the SNS automatically replaces the display of the social network items with a display of the avatar collage for social network accounts that have a small degree of separation from either one of the plurality of social networks and/or the social network account that posted the initial social network item. For example, the SNS determines based on data from Sally's Facenet account that Sally and Ritika are close friends. Thus, the SNS replaces the display of John, Arnab, Ritika, and Jagat's Facenet comments with the avatar collage of John, Arnab, Ritika, and Jagat. In some embodiments, the SNS generates for display a user interface option to display either the social network items or the avatar collage. The SNS replaces the display of the social network items with display of the avatar collage in response to receiving a user interface selection of the user interface option to display the avatar collage.

In some implementations, the SNS receives an additional social network item and determines that the additional social network item has the same topic that is common to the plurality of social network items. For example, the SNS determines that a comment from a device associated with Sally's Facenet account is about birthday wishes for Amit. In some embodiments, the SNS determines that the additional social network account that posted the additional social network item has a degree of separation below a threshold degree of separation from either the social network account that posted the initial social network item or at least one of the plurality of social network accounts. For example, the SNS determines, based on data from Sally's Facenet account, that Sally and Ritika are close friends.

In response to determining that the additional social network item has the same common topic and that the additional social network account has a small degree of separation, the SNS prevents the display of the additional social network item or the creation of a separate thread. In some approaches, the SNS generates for display a recommendation to the additional social network account to post the content of their social network item as a comment in the existing thread. For example, the SNS recommends to Sally's social network account to post her comment about Amit's birthday to the thread of comments relating to Amit's birthday, rather than posting it separately from the related comments.

In response to receiving a user interface selection accepting the recommendation, the SNS generates an avatar representation of the additional social network account, updates the avatar collage to include the additional avatar representation, and adds the content of the additional social network item to the avatar collage. For example, in response to a device associated with Sally's Facenet account accepting the recommendation, the SNS generates an avatar representation of Sally's Facenet account and adds the avatar representation and the content of Sally's Facenet comment to the avatar collage for Amit's birthday post.

In some embodiments, the SNS determines that the topic common to a plurality of social network items is related to a social network account. For example, the SNS determines that Amit, associated with Amit's Facenet account, is the subject of many birthday posts. In some embodiments, the SNS replaces the display of the plurality of social network items only for social networks accounts that have a large degree of separation from the topical social network account. For example, the SNS replaces the display of birthday Facenet posts for Amit with an avatar collage only for Facenet accounts that have a large degree of separation from Amit's Facenet account. Such aspects allow the SNS not to use up bandwidth and user interface space for social network accounts that are not closely related to the topical social network account. For example, the SNS displays an avatar collage of Amit's birthday thread for a social network account associated with Paul, who does not personally know Amit. Since Paul most likely does not care to see all of the comments in detail, the SNS saves bandwidth and user interface space by not displaying all of the comments in detail.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1A:
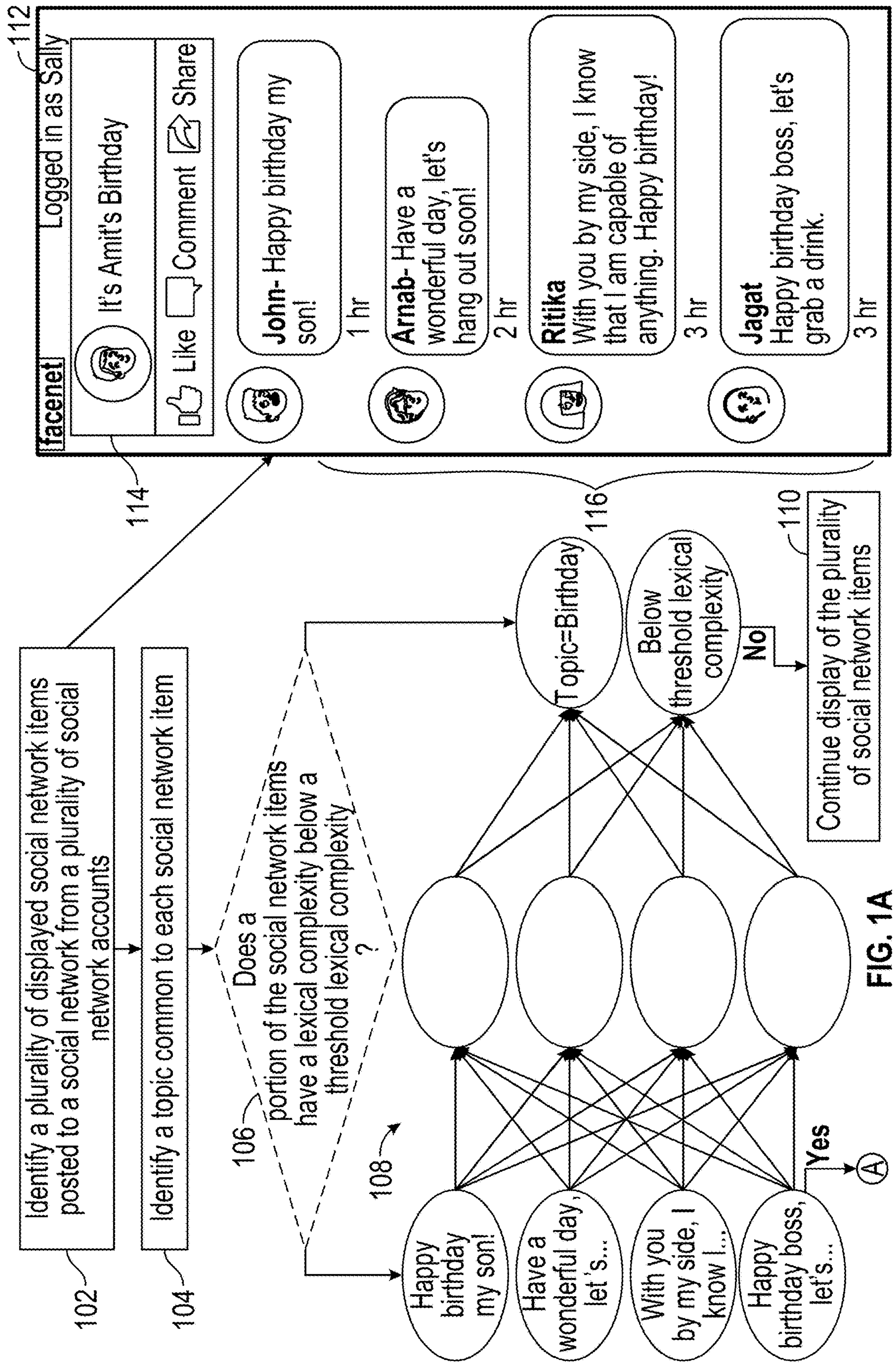
FIG. 1A shows an illustrative example of generating an avatar collage based on social network items, in accordance with some embodiments of this disclosure.
Figure 1B:
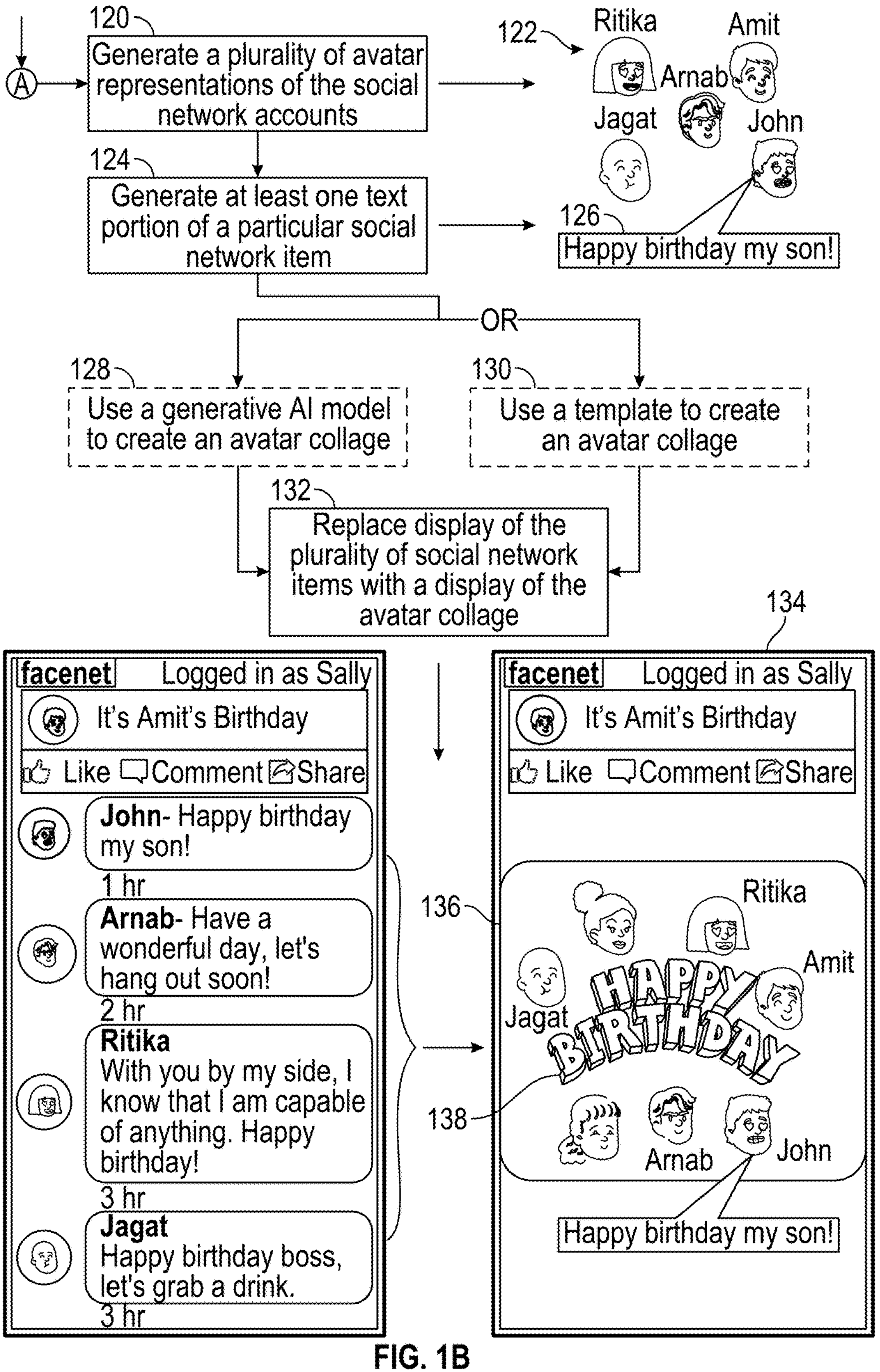
FIG. 1B shows an illustrative example of generating an avatar collage based on social network items, in accordance with some embodiments of this disclosure.
Figure 9:
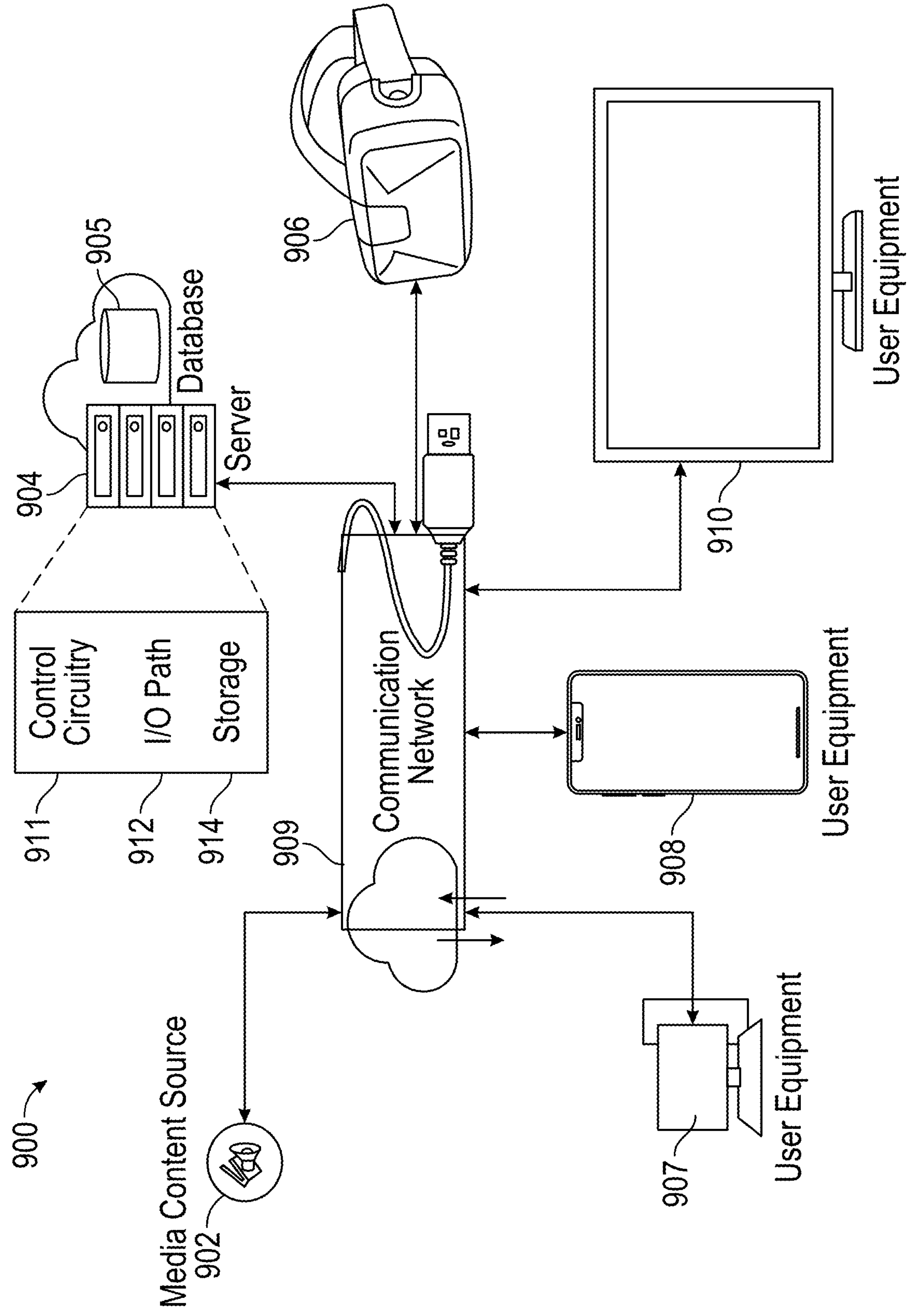
FIG. 9 describes illustrative devices, systems, servers, and related hardware for generating an avatar collage of media items, in accordance with some embodiments of this disclosure.

FIGS. 1A-1B depict a system, e.g., a social network system (SNS), for generating an avatar collage based on social network items, in accordance with some embodiments of this disclosure. In some embodiments, a social network application runs an SNS, e.g., on one or more devices 904, 906, 907, 908, 910 as shown in FIG. 9. In some implementations, the social network application, e.g., Facenet, runs on a server; a user equipment device, such as a laptop, smartphone, tablet, television; or any other suitable device; or any combination thereof. The social network application may run via a web browser or a standalone application. The social network application generates for display, at a device running the social network application, content received by a server of the social network application. In some embodiments, a server of the social network application receives new social network items via a user interface at a device running the social network application.

In some examples, a server of the SNS, e.g., server 904, identifies, at step 102, a plurality of social network items, e.g., the plurality of social network items 116, posted to a social network application from a plurality of social network accounts. In some embodiments, a social network item is an initial post made to a social network application, such as a text post, a collaborative post, a status post, etc. In some embodiments, a social network item is a sub-post, such as a reply to an initial social network post, a repost of an initial social network post, a comment on an initial social network post, etc. Posts and sub-posts may include text, images, graphics, videos, polls, tags, any other suitable content or any combination thereof. For example, Facenet previously received, via user interfaces of devices logged into Facenet accounts, Facenet posts. Facenet then aggregates Facenet posts into a feed for a given Facenet account.

In some approaches, a social network account is created when a user equipment device requests access to a social network application. A social network account may provide user equipment devices access to a social network's content. A social network account may have one set of credentials that allows access to the account. For example, a user equipment device associated with a user called Amit creates a Facenet account, e.g., a social network account. In some embodiments, a user equipment device logged in to a social network account can generate social network posts and sub-posts, view and reply to other social network accounts' posts and sub-posts, and share social network posts with other social network accounts. For example, the social network account associated with the user called Amit posts an initial social network item 114 with text "It's Amit's Birthday." The visibility of a social network item may depend on settings of the social network application. For example, a social network item is visible only to social network accounts that follow the social network account associated with the device that posted the social network item (e.g., the social network account is private). In another example, a social network item is visible to any social network account, regardless of whether the social network account follows the social network account associated with the device that posted the social network item (e.g., the social network account is public).

In the shown example, the plurality of social network items 116 is comprised of sub-posts from a plurality of social network accounts. For example, social network accounts associated with users called John, Arnab, Ritika, and Jagat each posted a comment in reply to Amit's initial social network item 114. For example, each social network item of the plurality of social network items 116 is a reply to initial social network item 114. In some embodiments, the initial social network item 114 and the plurality of social network items 116 form a thread of social network items. A thread comprises social network items that are linked to each other due to each social network item being a reply to the same initial social network post. In some embodiments, each thread of social network items has a unique conversation ID within a unique data structure.

In some embodiments, the social network application identifies a topic that is common to each social network item of the plurality of social network items. For example, at step 104, Facenet analyzes the plurality of social network items 116 from the social network accounts associated with John, Arnab, Ritika, and Jagat, and determines that a topic common to each sub-post is Amit's birthday. Topics may include a birthday of a user associated with a social network account, a graduation of a user associated with a social network account, a current event, a holiday, a celebration, any other suitable topic, or any combination thereof. In some embodiments, when each social network item of the plurality of social network items is posted in response to an initial social network item, the social network application determines that the topic of the plurality of social network items is the topic of the initial social network item. For example, Facenet determines that an initial Facenet post has a topic of Amit's birthday. Facenet then determines that the plurality of Facenet posts posted in response to the initial Facenet post (e.g., in a thread) also have the topic of Amit's birthday.

Facenet may identify two threads, both with the topic of Amit's birthday. In response to determining that it is Amit's birthday, Facenet creates an official thread for Facenet posts related to Amit's birthday. In some embodiments, the social network application creates and generates for display a thread (e.g., a template thread) in response to determining that an event is taking place or in response to an upcoming event (e.g., anniversary, birthday, etc.). Facenet may determine that it is Amit's birthday based on data from Amit's Facenet account and then creates a thread for users to enter their comments. Such a thread might also be associated with a template collage that is filled in as users enters their comments in the thread. In some embodiments, the social network application may create a joint thread in response to determining that an event involves two social network accounts. For example, Facenet creates a joint thread that is mirrored on both Amit and Ritika's Facenet accounts for Facenet posts related to Amit and Ritika's anniversary. The joint thread comprises a parent ID which allows the social network application to display the joint thread on multiple social network accounts. Facenet may also automatically create 2 separate threads for the same event (e.g., anniversary) and associate a first thread with a first user account (e.g., Amit's account) and a second thread with a second user account (e.g., Ritika's account). Both threads may then be associated with their own comments. The automatic creation of the template threads and collage maybe initially customized to reflect the event (e.g., birthday text, Amit & Ritika's anniversary, Ritika's & Amit's anniversary, etc.).

In some approaches, the social network application uses a trained neural network to identify the common topic, such as neural network 108. For example, neural network 108 is given an initial training set of popular topics comprising 1,000 known threads about, e.g., birthdays, holidays, congratulations, etc. If neural network 108 outputs inappropriate responses after the first training set, neural network 108 is given more training sets until neural network 108 outputs appropriate responses. Neural network 108 takes each of the plurality of social network items 116 as inputs, then outputs the identified topic. For example, the neural network 108 is trained in pattern recognition to detect themes of each item of the plurality of social network items 116.

In some implementations, the social network application determines, at step 106, that a portion of the social media items has a lexical complexity below a threshold lexical complexity. In some embodiments, the social network application determines the lexical complexity of each social network item of the plurality of social network items 116 via a technique known in the art, e.g., a neural network. In some approaches, the neural network used to determine lexical complexity is the same neural network 108 that is used to determine a common topic. Neural network 108 takes each of the plurality of social network items 116 as inputs, then outputs whether the determined lexical complexity is below a threshold lexical complexity. The social network application proceeds to step A. In some embodiments, the social network application determines the lexical complexity of each social network item of the plurality of social network items 116 via semantic and contextual analysis. The social network application analyzes the text of each social network item and determines a lexical complexity. The social network application may determine that at least a portion of the social network items has a determined lexical complexity below a threshold lexical complexity. If so, the social network application proceeds to step A.

In some embodiments, the social network application determines, at step 106, that a portion of the social network items has a lexical complexity above a threshold lexical complexity. A plurality of social network items with a lexical complexity above a threshold lexical complexity is not an appropriate candidate for an avatar collage. Thus, if the lexical complexity is above the threshold, the social network application proceeds to step 110, which continues the original display of the plurality of social network items. For example, if the text of a plurality of social network items is complex in semantic, contextual, and grammatical structure, the social network application deems it inappropriate to continue to step A.

In some embodiments, step A, as shown in FIG. 1B, begins with the social network application generating, at step 120 a plurality of avatar representations of the social network accounts that posted the initial social network item 114 and the plurality of social network accounts that posted the plurality of social network items 116. The plurality of avatar representations 122 may be JPEG files, GIF files, PNG files, PDF files, any other suitable image file type, or any combination thereof. In some embodiments, the social network application generates the plurality of avatar representations 122 based on the tone of each of the plurality of social network items and data from each respective social network account. For example, the social network application determines via semantic and sentiment analysis that the tone of the Facenet item posted by the Facenet account associated with the user called Ritika is heartfelt. The social network application determines via analysis of the data of the Facenet account associated with the user called Ritika that Ritika is Amit's wife. The social network application also determines what the user called Ritika looks like by analyzing photos posted to her Facenet account. Using the tone information and Facenet account information, the social network application generates an avatar representation that looks like the user called Ritika with heart eyes.

In some approaches, at step 124, the social network application generates at least one text portion, e.g., text 126, of a particular social network item of the plurality of social network items, e.g., plurality of social network items 116. In some embodiments, the at least one text portion is to be displayed proximate to the particular avatar representation of the particular social network account that posted the particular social network item. For example, the social network application is to display text 126 in a balloon callout proximate to the avatar representation of the social network account associated with the user called John. The degree of separation may be defined by the social network. For example, the degree of separation may be based on the two social network accounts being friends, friends of friends, and so on, or how much two social network accounts interact with each other, etc.

In some embodiments, the social network application selects the particular social network account from the plurality of social network accounts by determining that the particular social network account has the smallest degree of separation from the social network account accessing the social network. For example, the social network application determines that a social network account associated with a user called Sally is browsing Facenet, as shown by the text "Logged in as Sally" displayed at user interface 112 in FIG. 1A. The social network application determines, via analyzing data of her social network account, that Sally is good friends with John. Thus, the social network application generates for display the text 126 of the social network item posted by John. In some embodiments, the social network application selects the particular social network account of the plurality of social network accounts by determining that the particular social network account has the smallest degree of separation from the social network account that posted the initial social network post. For example, the social network account associated with Amit posted the initial social network item 114. The social network application determines, via analyzing data of John's Facenet account and Amit's Facenet account, that John and Amit have a close relationship. Thus, the social network application generates for display the text 126 of the social network item posted by John. In some embodiments, the social network application selects the particular social network account of the plurality of social network accounts by determining that the particular social network account has the smallest degree of separation from the social network account to which the social network items are directed. For example, the plurality of social network items 116 are directed toward the Facenet account associated with the user called Amit, thus Facenet generates for display the text of the social network item posted by the Facenet account that has the smallest degree of separation from the Facenet account associated with the user called Amit.

In some embodiments, the social network application generates the at least one text portion of the particular network item for a first period of time. The first period of time may be determined by the social network. In some embodiments, the social network application generates the at least one text portion of the particular network item for a second period of time. The second period of time may be the same as the first period of time. For example, the social network application generates text 126 for five seconds, then generates text from the social network item posted by the Facenet account associated with Ritika for five seconds. In some approaches, the social network application generates text from each item of the plurality of social network items 116 for a period of time.

In some embodiments, the social network application generates an avatar collage based on the plurality of avatar representations, e.g., the plurality of avatar representations 122, and the at least one text portion of a particular social network item, e.g., text 126. The avatar collage may be a JPEG file, GIF file, PNG file, PDF file, any other suitable image file type, or any combination thereof. At step 128, the social network application uses a generative AI model to create an avatar collage. For example, a generative AI model uses the plurality of avatar representations 122 and the text 126 as inputs in generating an avatar collage. In some embodiments, the social network application uses a template to create an avatar collage of the avatar representations and the at least one text portion of the particular social network item. In some embodiments, the social network application selects a template from a plurality of templates to generate an avatar collage.

A template may include a background based on the identified topic, an arrangement of the avatar representations, and/or other graphics related to the identified topics and/or avatar representations. For example, the social network application selects a birthday-themed template for the plurality of avatar representations 122 and the text 126 because the social network application determined, at step 104, that the topic common to each social network item is Amit's birthday. For example, the birthday-themed template has the avatar representations surrounding a graphic 138 that is birthday-themed. In some embodiments, the social network application generates an avatar collage based on the plurality of avatar representations for social network items that have a topic from a predefined list of topics. For example, after determining that the plurality of social network items 116 have the topic of Amit's birthday, Facenet confirms that "birthday" is on a list of topics eligible for avatar collage generation. In another example, after determining that a plurality of social network items have a topic of political debate, the social network application confirms that "politics" is not on a list of topics eligible for avatar collage generation.

Figure 5:
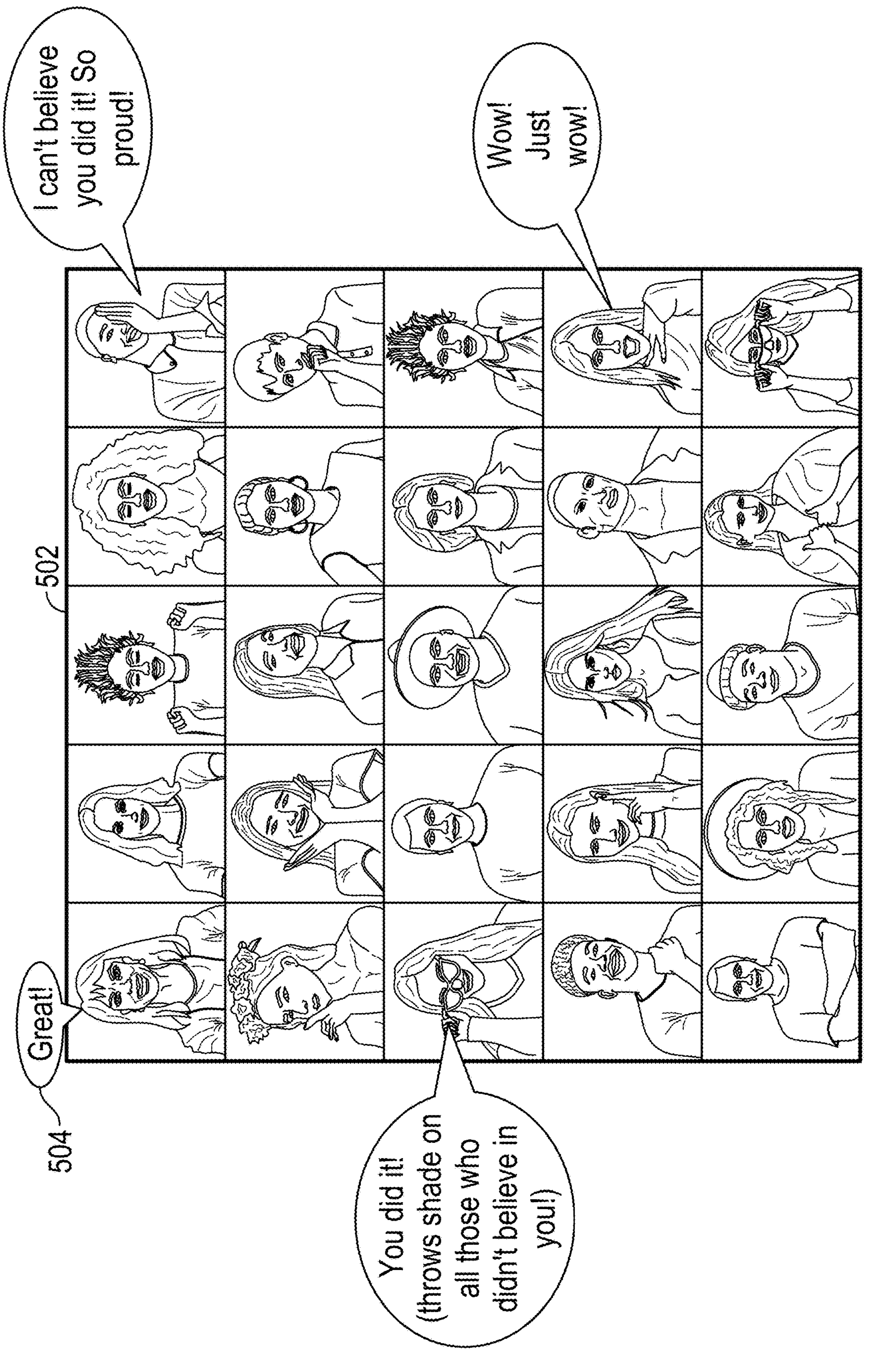
FIG. 5 shows a user interface display of a grid of photographs and text balloons from a social network application, in accordance with some embodiments of this disclosure.

In some approaches, the social network application arranges the avatar representations based on a degree of separation between respective social network accounts of the plurality of social network accounts. In some embodiments, the social network application arranges the avatar representations based on a degree of separation from the account that posted the initial social network item. The degree of separation may be defined by the social network. For example, the social network application places the avatar representations based on the Facenet accounts associated with Ritika and Amit directly next to each other because the social network application determines that the Facenet account associated with Ritika has the smallest degree of separation from the Facenet account associated with Amit. For example, the social network application places the avatar representations based on the Facenet accounts associated with Jagat and Amit across from each other because the social network account determines that the Facenet account associated with Jagat has a large degree of separation from the Facenet account associated with Amit. In some embodiments, the social network application arranges the plurality of avatar representations in a grid along with callout balloons of portions of text. FIG. 5 provides an example implementation of arranging the plurality of avatar representations in a grid along with callout balloons of portions of text. In some embodiments, the social network application groups social network accounts together into one avatar for threads that have a large number of social network items. For example, the groups of social network accounts can be based on the relationships of each social network account to the social network account that posted the initial social network item, e.g., friends, family, coworkers, etc.

Figure 2A:
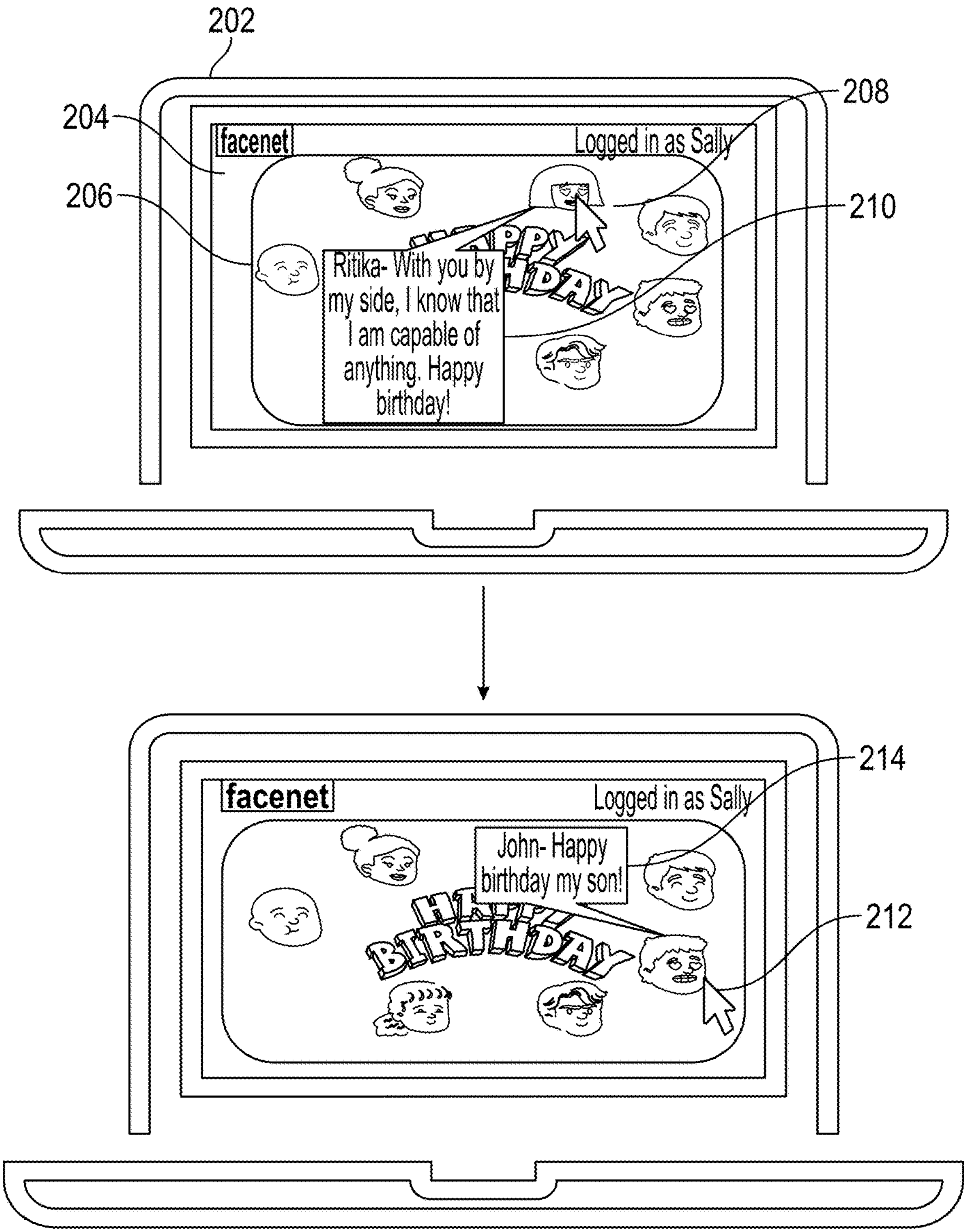
FIG. 2A shows user interfaces of a social network application for generating text of a social network item in response to receiving a user interface interaction, in accordance with some embodiments of this disclosure.
Figure 2B:
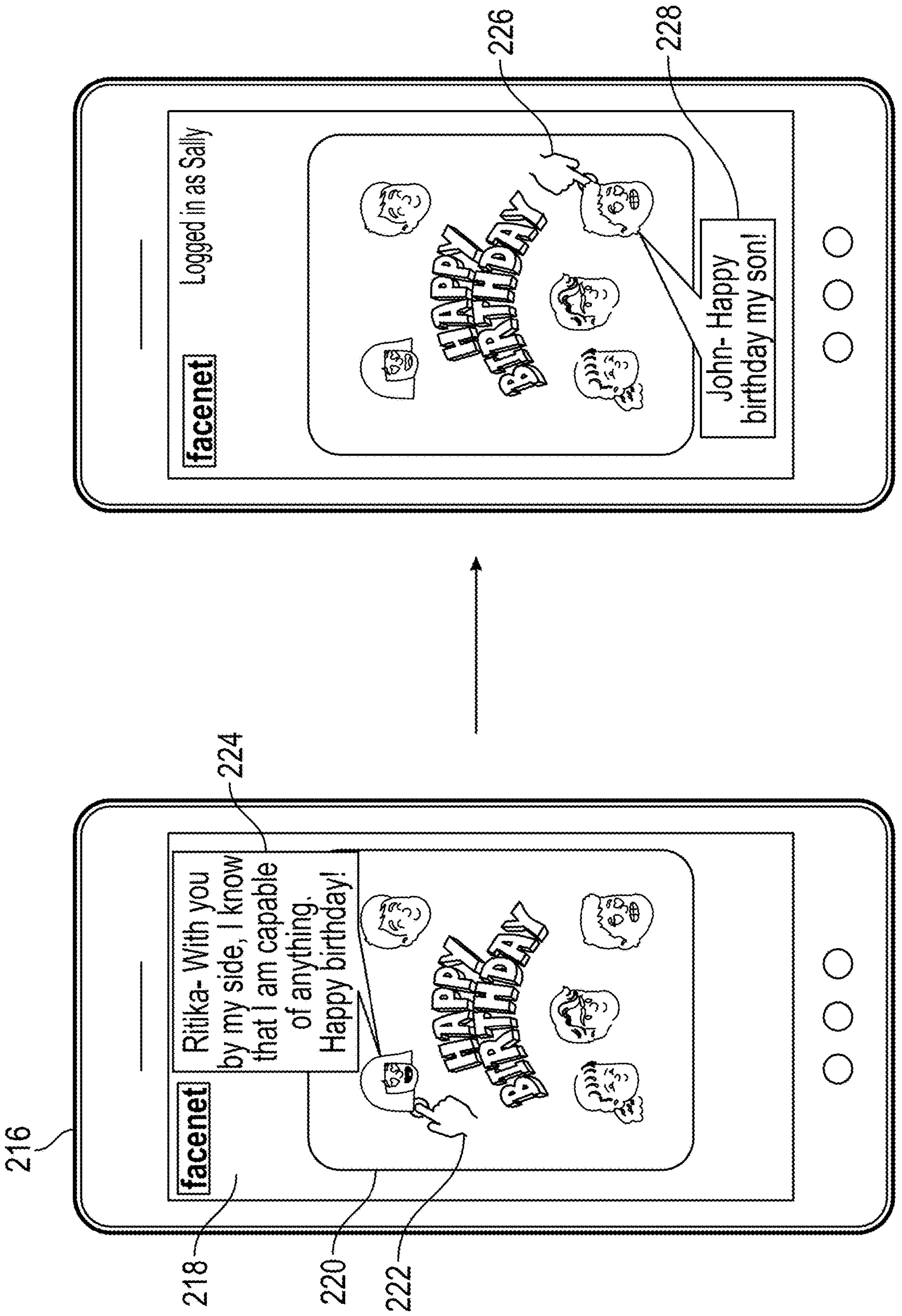
FIG. 2B shows user interfaces of a social network application for generating text of a social network item in response to receiving a user interface interaction, in accordance with some embodiments of this disclosure.
Figure 4:
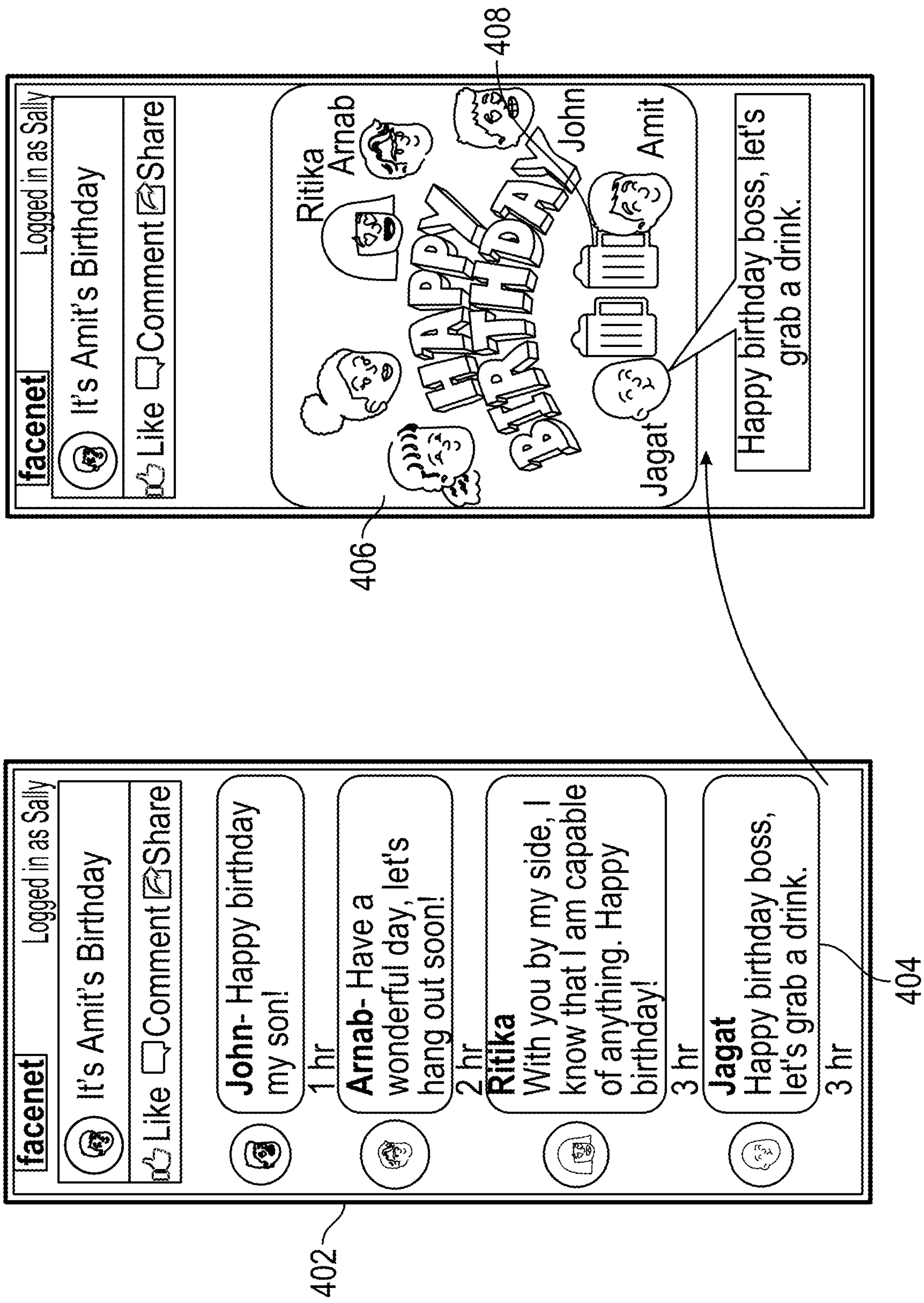
FIG. 4 shows a user interface of a social network application that displays a depiction of an object referenced in text of a social network item, in accordance with some embodiments of this disclosure.

In some embodiments, the social network application generates a depiction of an object proximate to the plurality of avatar representations. The object may be a 2D image, a 3D model, or a video clip. The object is referenced in at least one text portion of a social network item of the plurality of social network items or related to text of a social network item of the plurality of social network items. FIG. 4 provides an example implementation of generating a depiction of an object proximate to the plurality of avatar representations. In some approaches, the social network application generates at least one respective text portion of a respective social network item in response to receiving a user interaction at an avatar representation of the respective social network account from which the respective social network item was posted. FIGS. 2A-2B provide example implementations of generating text in response to receiving a user interaction at an avatar representation. In some embodiments, the avatar collage is animated. For example, the plurality of avatar representations are animated and interact with one another. In some embodiments, the social network application uses a key frame from a video posted by a social network account to generate the avatar representation of the social network application. For example, the social network application tags, at the avatar representation, the original video from which the key frame was taken and plays the video upon receiving a user interface interaction at the portion of the screen that displays the avatar representation.

Figure 3:
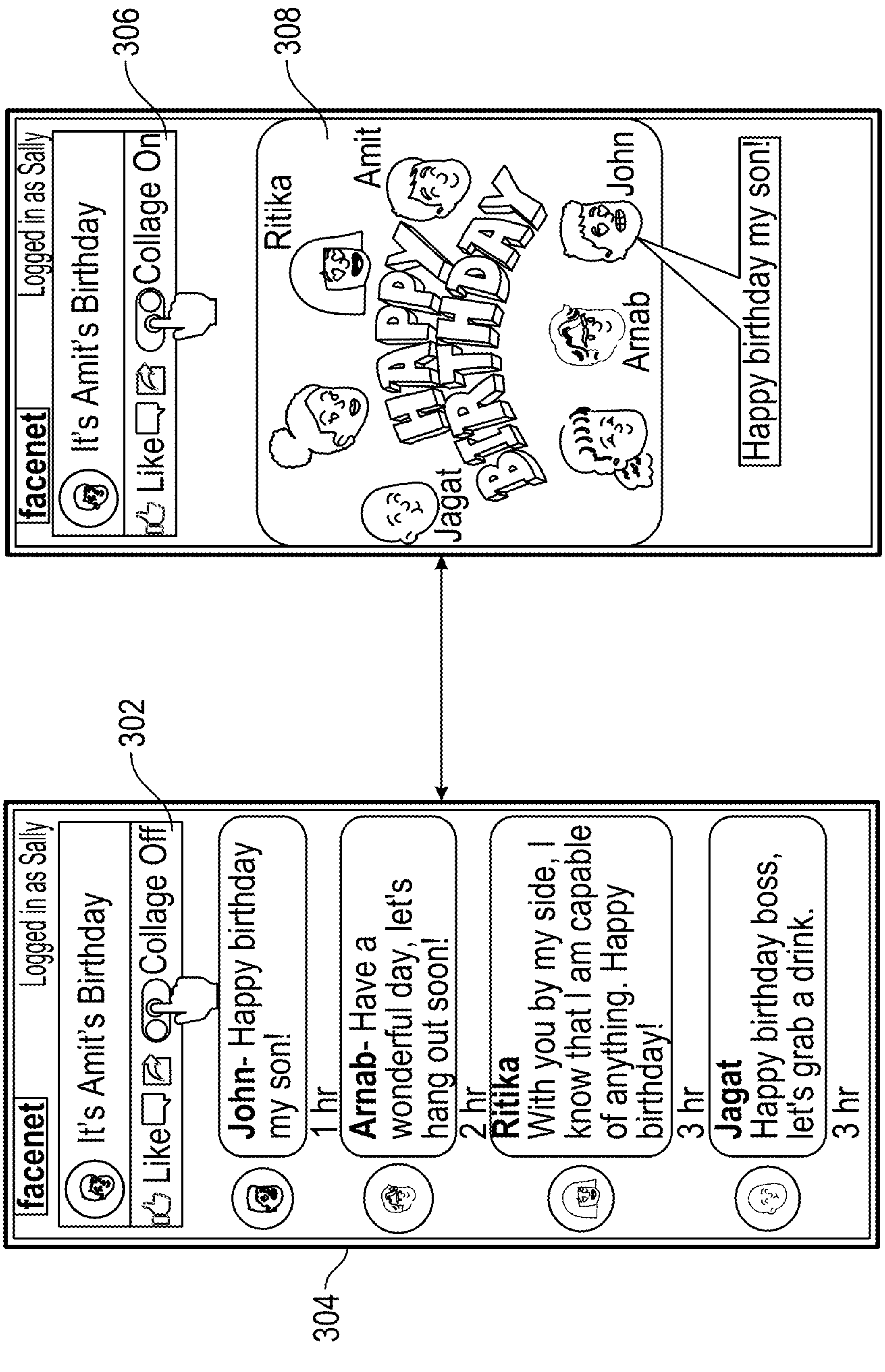
FIG. 3 shows user interfaces of a social network application with user interface options for toggling display of an avatar collage, in accordance with some embodiments of this disclosure.

In some implementations, at step 132, the social network application replaces the display of the plurality of social network items with a display of the avatar collage. For example, the social network application replaces user interface 112 with user interface 134. For example, user interface 134 maintains display of initial social network item 114 but replaces display of the plurality of social network items 116 with display of avatar collage 136. In some embodiments, the social network application replaces the initial social network post as well as the plurality of social network items. In some embodiments, the social network application receives a user interface selection of a user interface option to replace the display of the plurality of social network items with a display of the avatar collage, or vice versa. FIG. 3 provides an example implementation of replacing the display of the plurality of social network items with a display of the avatar collage in response to receiving a user interface selection of a user interface option. In some embodiments, the social network application provides a user interface option which, when selected via a user interface selection, allows social network accounts to share the avatar collage with other social network accounts. In some approaches, the social network application replaces the display of the plurality of social network items with a display of the avatar collage when the device accessing the social network application has limited user interface space. For example, because the size of a mobile phone screen is smaller than the size of a laptop screen, the social network application replaces the display of the plurality of social network items, on a mobile phone, with a display of the avatar collage since the avatar collage takes less user interface space. The social network application may replace the display of the plurality of social network items with a display of the avatar collage if the device accessing the social network application is touch-enabled.

In some embodiments, the social network application replaces the display of the plurality of social network items from a display of the avatar collage for all devices logged in to a social network account of the social network. For example, Facenet displays avatar collage 136 to any Facenet account that encounters initial social network item 114. This approach saves the social network application the most user interface space and bandwidth. In some embodiments, the social network application replaces the display of the plurality of social network items with a display of the avatar collage based on a determined degree of separation of a social network account accessing the social network. For example, the social network application determines that a Facenet account associated with a user called Fred has a large degree of separation with the Facenet account associated with the user called Amit. Thus, the social network application replaces display of the plurality of social network items 116 with display of avatar collage 136 for the Facenet account associated with the user called Fred. The social network application determines that Fred has a low interest in the details of the plurality of social network items 116, thus the social network application saves user interface space and bandwidth for the device logged into the Facenet account associated with the user called Fred.

In some implementations, the social network application receives an additional social network item from an additional social network account. For example, a server, e.g., server 904 of FIG. 9, of the social network application receives a post written by a Facenet account associated with a user called Tim. The social network application determines that the additional social network item has the same topic that is common to the plurality of social network items. For example, the social network, via, e.g., neural network 108, determines that the topic of the post written by the Facenet account associated with the user called Tim is Amit's birthday. In some embodiments, the social network application also determines that the additional social network item has a lexical complexity below a threshold lexical complexity. In some approaches, in response to determining that the additional social network item has the same topic common to the plurality of social network items, the social network application prevents display of the additional social network item and updates the avatar collage with an additional avatar representation of the additional social network account.

For example, in response to determining that the topic of the post written by the Facenet account associated with the user called Tim is Amit's birthday, the social network application generates an avatar representation of the Facenet account associated with the user called Tim. For example, the social network application prevents display of the additional social network item posted by the Facenet account associated with the user called Tim. In some embodiments, the social network application generates for display a notification on a screen of a device logged in to the social network account. The notification communicates that the additional social network item has the same topic common to a plurality of existing social network items, e.g., an existing thread. In some embodiments, the notification displays a user interface option to post the additional social network item to the existing thread. In some embodiments, the notification displays a user interface option to post the additional social network item separately from the existing thread. For example, Facenet displays a notification on a screen of a device logged in to the Facenet account associated with the user called Tim that says "A thread for Amit's Birthday already exists. Select 'Yes' to post your birthday message to the thread. Select 'No' to post your birthday message separately from the thread."

In some embodiments, the social network application automatically posts the additional social network item to the existing thread of the plurality of social network items. For example, after determining that the Facenet post made by the Facenet account associated with Tim is about Amit's birthday, the social network application adds the additional social network item to the plurality of social network items 116. In some embodiments, the social network application adds the additional avatar representation to the avatar collage. For example, the social network application updates avatar collage 136 to include the additional avatar representation based on the Facenet account associated with the user called Tim and the tone of Tim's post. In some implementations, the social network application displays the avatar collage in addition to the plurality of social network items. For example, avatar collage 136, displayed proximate to the plurality of social network items 116, serves as a complement to the plurality of social network items 116 within the same user interface. In some embodiments, the social network application displays an avatar collage for a portion of the social network items and simultaneously displays social network items that did not meet the criteria for avatar collage generation (e.g., no common topic and/or high lexical complexity). For example, a user interface option "Show other comments" is displayed proximate to an avatar collage. In response to receiving a user interface selection of the user interface option, the social network application displays social network items, in a thread of text posts, that did not get included in the avatar collage.

The aspects of FIG. 1 allow the social network application to use less user interface space in embodiments where the number of social network items exceeds the user interface space required for an avatar collage. The avatar collage may also be more memorable to users of the social network application. The avatar collage may also enable the social network application to develop a quick summary of the plurality of social network items such that users of the social network application can more efficiently process the information via a visual depiction. Information communicated via text is often more difficult for users to process than information communicated via visual depictions. Linear presentation of social network items may require excess scrolling, which degrades user experience. Thus, the avatar collage may improve user experience by removing the need for excess scrolling.

FIG. 2A depicts a user interface of a social network application (e.g., social network application Facenet, as described above in connection with FIG. 1) for generating text of a social network item in response to receiving a user interface interaction, in accordance with some embodiments of this disclosure. In some embodiments, a social network application runs a social network system (SNS), e.g., on one or more devices 904, 906, 907, 908, 910 as shown in FIG. 9. In some implementations, the social network application, e.g., Facenet, runs on a server; a user equipment device, such as a laptop, smartphone, tablet, or television; any other suitable device; or any combination thereof.

In some approaches, device 202, e.g., a laptop, is accessing a social network application, e.g., Facenet, via a social network account. User interface 204 is a variant of user interface 134, as described above in connection with FIG. 1B. In some embodiments, the avatar collage, e.g., avatar collage 206, is displayed according to the specifications of the user interface space available. User interface 204 displays a larger avatar collage, e.g., avatar collage 206, than avatar collage 136 because device 202 has a larger display screen than the device displaying user interface 134. A server, e.g., server 904, receives an indication from device 202 that a user interaction 208 is occurring at an avatar representation of the plurality of avatar representations. In some embodiments, a user interaction is a cursor interaction at a portion of a display screen displaying the avatar representation on a device. In some embodiments, a cursor interaction is caused by the physical movement of a mouse, physical pressure and movement on a touchpad of a laptop, any other suitable cause, or any combination thereof. For example, a user associated with a Facenet account accessed on a device, e.g., device 202, causes user interaction 208 by moving a mouse associated with device 202 to a portion of the screen displaying the avatar representation associated with the Facenet account of a user called Ritika.

In some embodiments, in response to receiving a user interaction, a server, e.g., server 904, sends at least one text portion of the social network item associated with the avatar representation that is displayed at the portion of the screen where the user interaction occurred to the device, e.g., device 202. For example, in response to receiving user interaction 208, a Facenet server, e.g., server 904, sends at least one text portion of the Facenet comment posted by the Facenet account associated with the user called Ritika to device 202. In some embodiments, the social network application generates for display at the device, e.g., device 202, the at least one text portion of the social network item proximate to the avatar representation that is located at the portion of the screen where the user interaction, e.g., user interaction 208, occurred. For example, the social network application generates for display text callout 210, comprising the text of the Facenet comment posted by the Facenet account associated with the user called Ritika, next to the avatar representation based on the Facenet account associated with the user called Ritika at user interface 204.

In some embodiments, a user associated with a device, e.g., device 202, causes another user interaction, e.g., user interaction 212, within user interface 204. User interaction 212 occurs in response to the user associated with device 202 moving the cursor associated with device 202 to another portion of the screen displaying another avatar representation. For example, the user associated with device 202 moves the mouse associated with device 202 to the portion of the screen displaying the avatar representation based on the Facenet account associated with the user called John. In response, a Facenet server, e.g., server 904, sends at least one text portion of the Facenet comment posted by the Facenet account associated with the user called John to device 202. In some embodiments, the social network application generates for display at the device, e.g., device 202, the at least one text portion of the social network item proximate to the avatar representation that is located at the portion of the screen where the user interaction, e.g., user interaction 212, occurred. For example, the social network application generates for display text callout 214, comprising the text of the Facenet comment posted by the Facenet account associated with the user called John, next to the avatar representation based on the Facenet account associated with the user called John at user interface 204. In some embodiments, the social network item contains audio and/or video data. In some embodiments, the social network plays the audio and/or video when the social network receives a user interface interaction at a portion of the screen displaying the avatar representation that posted the audio and/or video content.

FIG. 2B depicts a user interface of a social network application (e.g., social network application Facenet, as described above in connection with FIG. 1) for generating text of a social network item in response to receiving a user interface interaction, in accordance with some embodiments of this disclosure. In some embodiments, a social network application runs a social network system (SNS), e.g., on one or more devices 904, 906, 907, 908, 910 as shown in FIG. 9. In some implementations, the social network application, e.g., Facenet, runs on a server; a user equipment device, such as a laptop, smartphone, tablet, television; any other suitable device; or any combination thereof.

In some approaches, device 216, e.g., a smartphone, is accessing a social network application, e.g., Facenet, via a social network account. User interface 218 is a variant of user interface 134, as described above in connection with FIG. 1B. A server, e.g., server 904, receives an indication from device 216 that a user interaction 222 is occurring at an avatar representation of the plurality of avatar representations. Avatar collage 220 is a variant of avatar collage 136, as described above in connection with FIG. 1B. In some embodiments, the avatar collage, e.g., avatar collage 220, is displayed according to the specifications of the user interface space available. In some embodiments, a user interaction is a touch at a portion of a touchscreen displaying the avatar representation on a touch-enabled device. For example, a user associated with a Facenet account accessed on a device, e.g., device 216, causes user interaction 222 by touching a portion of the screen displaying the avatar representation associated with the Facenet account of a user called Ritika.

In some embodiments, in response to receiving a user interaction, a server, e.g., server 904, sends at least one text portion of the social network item associated with the avatar representation that is displayed at the portion of the screen where the user interaction occurred to the device, e.g., device 216. For example, in response to receiving user interaction 222, a Facenet server, e.g., server 904, sends at least one text portion of the Facenet comment posted by the Facenet account associated with the user called Ritika to device 216. In some embodiments, the social network application generates for display at the device, e.g., device 216, the at least one text portion of the social network item proximate to the avatar representation that is located at the portion of the screen where the user interaction, e.g., user interaction 222, occurred. For example, the social network application generates for display text callout 224, comprising the text of the Facenet comment posted by the Facenet account associated with the user called Ritika, next to the avatar representation based on the Facenet account associated with the user called Ritika at user interface 218.

In some embodiments, a user associated with a device, e.g., device 216, causes another user interaction, e.g., user interaction 226, within user interface 204. User interaction 226 occurs in response to the user associated with device 216 touching another portion of the screen of device 216 displaying another avatar representation. For example, the user associated with device 216 touches the portion of the screen displaying the avatar representation based on the Facenet account associated with the user called John. In response, a Facenet server, e.g., server 904, sends at least one text portion of the Facenet comment posted by the Facenet account associated with the user called John to device 216. In some embodiments, the social network application generates for display at the device, e.g., device 216, the at least one text portion of the social network item proximate to the avatar representation that is located at the portion of the screen where the user interaction, e.g., user interaction 226, occurred. For example, the social network application generates for display text callout 228, comprising the text of the Facenet comment posted by the Facenet account associated with the user called John, next to the avatar representation based on the Facenet account associated with the user called John at user interface 218.

FIG. 3 depicts user interfaces of a social network application (e.g., social network application Facenet, as described above in connection with FIGS. 1A-1B) for generating user interface options for toggling display of an avatar collage, in accordance with some embodiments of this disclosure. In some embodiments, a social network application runs a social network system (SNS), e.g., on one or more devices 904, 906, 907, 908, 910 as shown in FIG. 9. In some implementations, the social network application, e.g., Facenet, runs on a server; a user equipment device, such as a laptop, smartphone, tablet, television; any other suitable device; or any combination thereof. User interface 304 is a variant of user interface 112, as described above in connection with FIG. 1A. User interface 308 is a variant of user interface 134, as described above in connection with FIG. 1B.

In some embodiments, the social network application generates for display a user interface option to replace the display of the avatar collage with the display of the plurality of social network items. The user interface option may be a toggle button, a dropdown button, a text button, an outlined button, any other suitable user interface button, or any combination thereof. For example, user interface 304 displays a toggle button in the "Collage Off" position 302 among other user interface options within the initial social network item. The social network application, e.g., Facenet, displays the plurality of social network items at user interface 304 because the toggle button is in the "Collage Off" position 302. In response to receiving an indication of a user interface selection of the user interface option from a device accessing the social network, the social network application replaces the display of the plurality of social network items with the display of the avatar collage based on the plurality of social network items. For example, in response to receiving a user interface selection of the toggle button while it is in position 302, a device that is accessing Facenet replaces the Facenet comments from Facenet accounts associated with users John, Arnab, Ritika, and Jagat with an avatar collage based on the Facenet comments as shown at user interface 308.

In some embodiments, the social network application receives a user interface selection of the user interface option while the social network application is displaying the avatar collage. For example, the social network application, e.g., Facenet, displays the plurality of social network items at user interface 308 because the toggle button is in the "Collage On" position 306. In response to receiving an indication, from a device accessing Facenet, of a user interface selection while the toggle button is in the "Collage On" position 306, Facenet replaces the display of the avatar collage with the display of the plurality of Facenet comments as shown at user interface 304.

FIG. 4 depicts a user interface of a social network application (e.g., social network application Facenet, as described above in connection with FIGS. 1A-1B) to display a depiction of an object referenced in a portion of text of a social network item, in accordance with some embodiments of this disclosure. In some embodiments, a social network application runs a social network system (SNS), e.g., on one or more devices 904, 906, 907, 908, 910 as shown in FIG.

9. In some implementations, the social network application, e.g., Facenet, runs on a server; a user equipment device, such as a laptop, smartphone, tablet, television; any other suitable device; or any combination thereof.

In some embodiments, the social network application generates a depiction of an object proximate to the plurality of avatar representations. In some embodiments, the social network application identifies, from the text of a social network item of the plurality of social network items, a word for an object. In some embodiments, the social network application identifies the word by a technique known in the art, such as a neural network, e.g., neural network 108, and/or from semantic and contextual analysis. For example, Facenet identifies word 404 "drink," via neural network 108, as referring to an object (e.g., an alcoholic beverage) from the Facenet comment posted by the Facenet account associated with a user called Jagat at user interface 402. In some approaches, in response to identifying text that refers to an object, the social network application generates for display a visual depiction of the object.

In some embodiments, the depiction of the object may be a JPEG file, GIF file, PNG file, PDF file, any other suitable image file type, or any combination thereof. In some embodiments, the depiction of the object is generated by a generative AI model or selected from an image database. In some implementations, the depiction of the object is displayed proximate to the avatar representation of the social network account that posted the social network item from which the word representing the object was identified. For example, Facenet generates for display image 408 at a device logged in to Facenet that is displaying user interface 406. Image 408 depicts two steins of beer because Facenet determined that word 404 "drink" refers to an alcoholic beverage. For example, Facenet also determines, from semantic and contextual analysis of the text of the Facenet comment posted by the Facenet account associated with the user called Jagat, that image 408 needs two steins rather than one stein because a portion of the text says "Let's" which implies that both Jagat and Amit will have a drink.

In some embodiments, the social network application displays the depiction of the object proximate to the avatar representation based on the social network account that posted the respective social network item from which the object was identified. In some embodiments, the social network application also displays the depiction of the object proximate to an avatar representation that is referred to in at least one portion of text of the social network item from which the object was identified. For example, Facenet displays image 408 next to the avatar representations of the Facenet accounts associated with the users called Jagat and Amit because the Facenet comment from which the object was identified refers to both the user called Jagat and the user called Amit.

In some implementations, the social network application generates for display at least one portion of text from the social network item from which the object was identified proximate to the respective avatar representation of the social network account that posted the social network item. For example, Facenet displays, at a device displaying user interface 406, the text of the Facenet comment posted by the Facenet account associated with the user called Jagat proximate to the avatar representation of the Facenet account associated with the user called Jagat. In some embodiments, the social network application generates for display a depiction of an object that is related to the identified topic common to the plurality of social network items. For example, Facenet generates for display, proximate to display of an avatar collage, a visual depiction of a cake (not shown) because Facenet determines that a cake is an object commonly associated with an identified topic of "birthday."

FIG. 5 depicts a user interface of a social network application (e.g., social network application Facenet, as described above in connection with FIGS. 1A-1B) with a grid of photographs and text balloons, in accordance with some embodiments of this disclosure. In some embodiments, a social network application runs a social network system (SNS), e.g., on one or more devices 904, 906, 907, 908, 910 as shown in FIG. 9. In some implementations, the social network application, e.g., Facenet, runs on a server; a user equipment device, such as a laptop, smartphone, tablet, television; any other suitable device; or any combination thereof.

In some embodiments, the social network application generates for display a grid, e.g., grid 502, as an avatar collage. For example, Facenet generates for display grid 502 to replace the display of, e.g., plurality of social network items 116, as described above in connection with FIG. 1A. In some approaches the social network application generates the grid using photographs that the social network identifies from each social network account that posted a social network item of the plurality of social network items. For example, Facenet identifies photographs from the Facenet accounts associated with users called John, Ritika, Arnab, and Jagat. Facenet arranges the identified photographs in a grid formation, e.g., grid 502. In some implementations, the grid comprises at least one text callout, e.g., text callout 504, which comprises at least a portion of the text of a respective social network item. In some embodiments, the social network application generates an avatar representation of each social network account that posted a social network item of the plurality of social network items. In some embodiments, the social network application arranges the generated avatar representations in a grid formation. In some embodiments, the images of the grid are arranged based on a degree of separation, defined by the social network, of the respective social network accounts. In some embodiments, the images of the grid are arranged based on a degree of separation from the social network account that posted the initial social network item.

For example, a Facenet account associated with a user called Cindy posts a comment comprising the text "Great!" to a thread of congratulatory posts. Facenet identifies a photograph of the user called Cindy from data of the Facenet account associated with the user called Cindy. Facenet adds the photograph of the user called Cindy to grid 502 of photographs of users associated with Facenet accounts that posted to the thread of congratulatory posts. Facenet generates for display text callout 504 proximate to the photograph of the user called Cindy in grid 502. In some embodiments, the social network application generates for display text of a social network item in response to receiving a user interface interaction at a portion of the screen, within a grid, generating for display a photograph associated with a social network account that posted the social network item. For example, Facenet receives a cursor hover over the photograph of the user called Cindy in grid 502. In response, Facenet generates for display the text callout 504 proximate to the photograph of the user called Cindy in grid 502.

Figure 6:
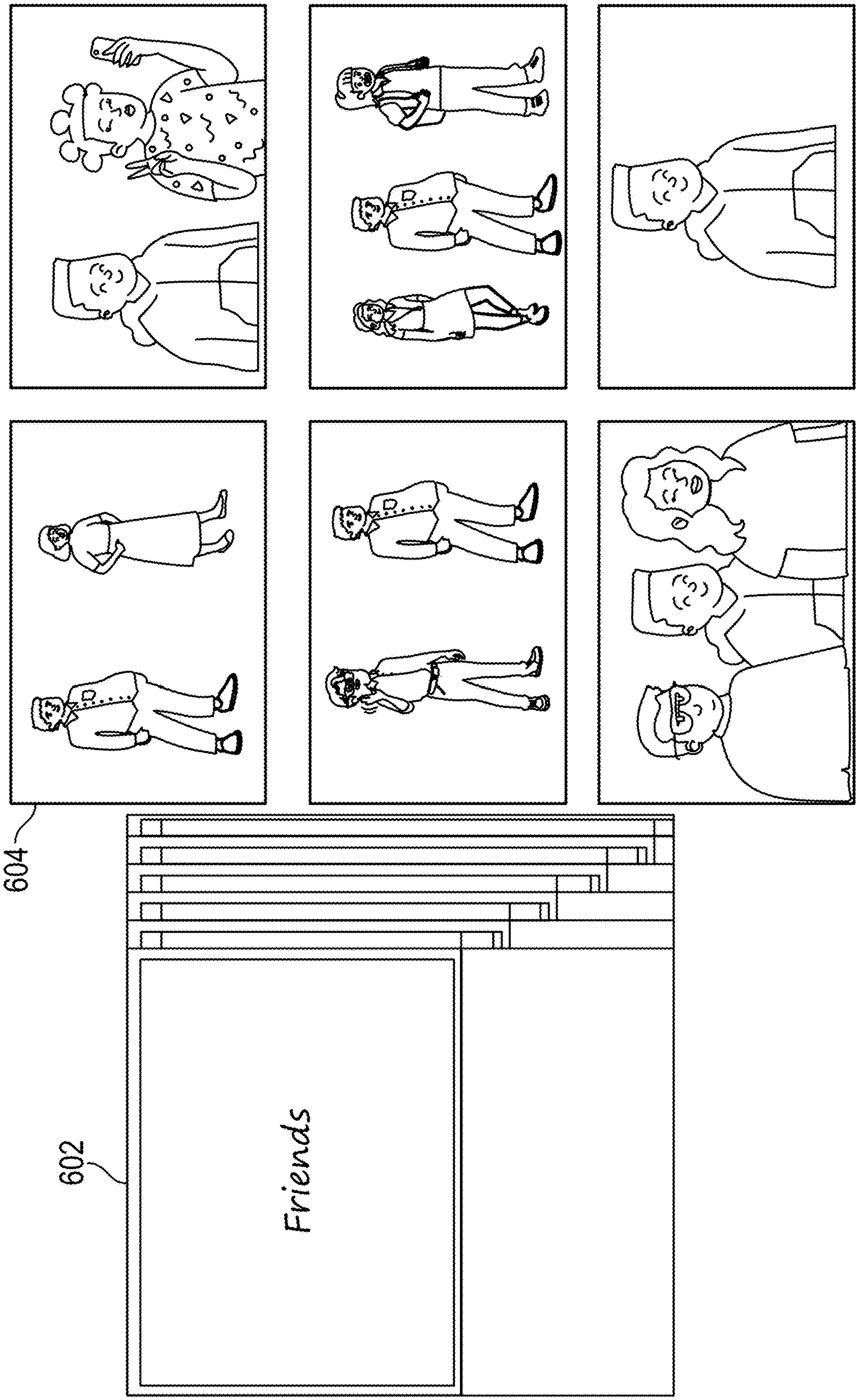
FIG. 6 shows a flipbook of photographs from a social network application, in accordance with some embodiments of this disclosure.

FIG. 6 depicts a user interface of a social network application (e.g., social network application Facenet, as described above in connection with FIG. 1) with a flipbook of photographs from the social network application, in accordance with some embodiments of this disclosure. In some embodiments, a social network application runs a social network system (SNS), e.g., on one or more devices 904, 906, 907, 908, 910 as shown in FIG. 9. In some implementations, the social network application, e.g., Facenet, runs on a server; a user equipment device, such as a laptop, smartphone, tablet, television; any other suitable device; or any combination thereof.

In some embodiments, the social network application generates for display a flipbook of images based on a plurality of social network items, e.g., the plurality of social network items 116, as described above in connection with FIG. 1A. In some embodiments, each page of the flipbook has a page for a set of social network accounts based on a relationship type determined by the social network application. For example, one page of the flipbook comprises images based on social network accounts associated with coworkers, one page of the flipbook comprises images based on social network accounts associated with family, one page of the flipbook comprises images based on social network accounts associated with friends, etc. In some embodiments, each page of the flipbook comprises a predetermined number of images, where the social network application arranges the images according to the time the social network application receives each respective social network item.

In some embodiments, the social network application identifies photographs posted by the plurality of social network accounts that also posted the plurality of social network items. The photographs may be related to an identified topic of the plurality of social network items, as described above in connection with FIGS. 1A-1B, and/or to the user associated with the respective social network account. In some embodiments, the social network application generates the flipbook with the identified photographs.

For example, Facenet identifies a Facenet comment from a Facenet account associated with a user called Sally and determines, via a degree of separation defined by Facenet, that Sally and Amit are friends. Facenet identifies photographs from the Facenet account associated with the user called Sally. The photographs depict images of users Sally and Amit because Facenet determines that the topic of the plurality of Facenet comments is Amit's birthday and Sally is the user that is associated with the respective Facenet account that posted the Facenet comment. Thus, Facenet adds the identified photographs to flipbook page 602 that displays photographs 604 of the user Amit and his friends. In some implementations, the flipbook comprises at least one text portion of a social network item of the plurality of social network items.

Figure 7:
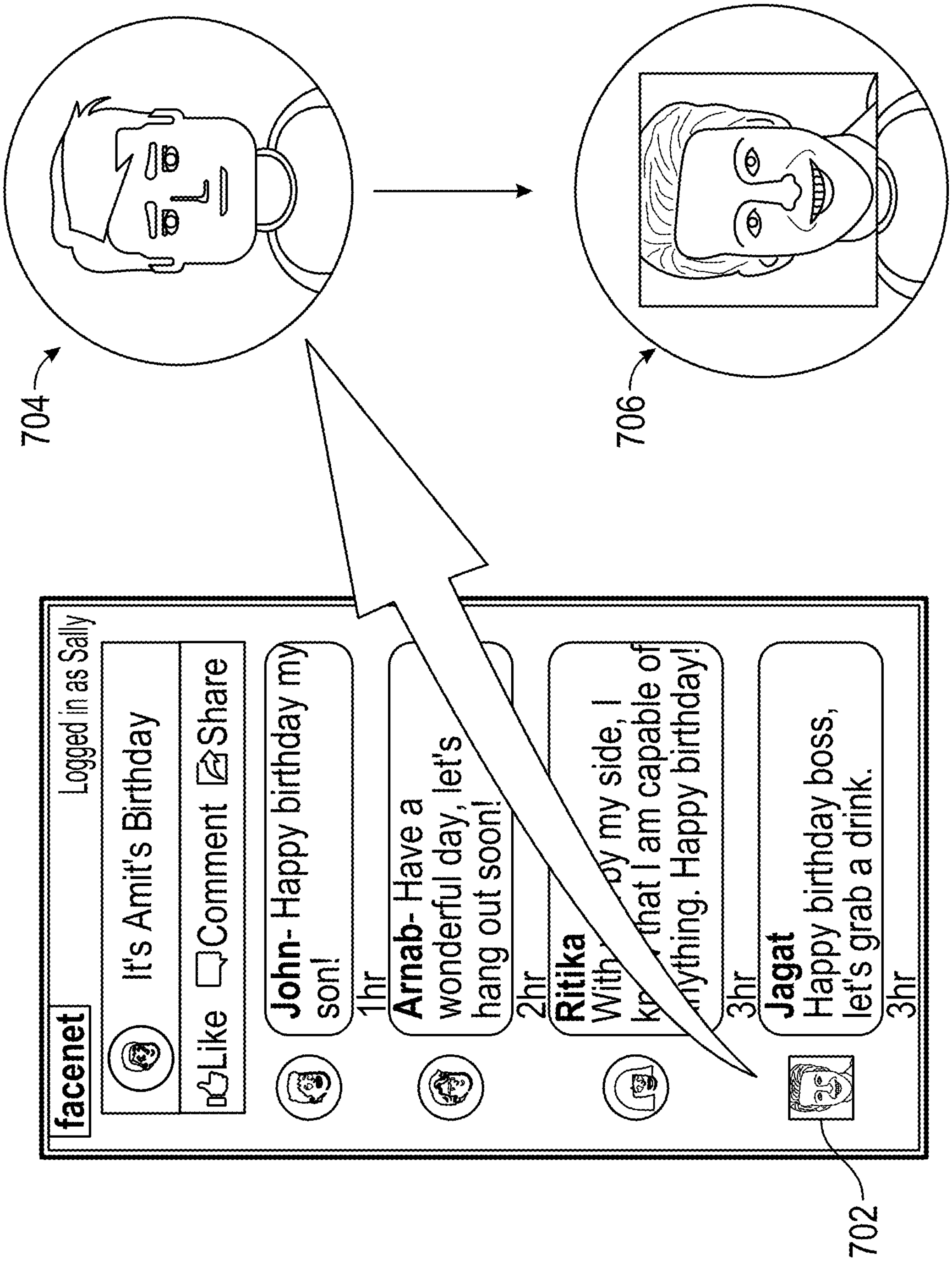
FIG. 7 shows a user interface of a social network application that displays an avatar representation generated with a photograph from the social network application, in accordance with some embodiments of this disclosure.

FIG. 7 depicts a user interface of a social network application (e.g., social network application Facenet, as described above in connection with FIGS. 1A-1B) that displays an avatar representation generated with a photograph from the social network application, in accordance with some embodiments of this disclosure. In some embodiments, a social network application runs a social network system (SNS), e.g., on one or more devices 904, 906, 907, 908, 910 as shown in FIG. 9. In some implementations, the social network application, e.g., Facenet, runs on a server; a user equipment device, such as a laptop, smartphone, tablet, television; any other suitable device; or any combination thereof.

In some embodiments, the social network application generates at least one avatar representation of the plurality of avatar representations using at least one respective profile picture of a social network account that posted a respective social network item of the plurality of social network items. In some embodiments, the at least one profile picture is a photograph of the user associated with the respective social network account. For example, Facenet identifies profile picture 702, which is a photograph of the user called Jagat associated with the Facenet account. In some implementations, the social network application generates an avatar representation using the profile picture instead of generating a cartoon and/or animated depiction. The social network application may use the profile picture in response to receiving a user interface selection to use a profile picture, or the social network application may use the profile picture automatically.

For example, after identifying profile picture 702, Facenet identifies a graphic avatar representation 704 of the Facenet account associated with the user called Jagat. Facenet receives a user interface selection from the Facenet account associated with the user called Jagat indicating to use the profile picture associated with the Facenet account associated with the user called Jagat for avatar representation generation. Thus, Facenet generates avatar representation 706 for the Facenet account associated with the user called Jagat. Facenet uses avatar representation when Facenet generates an avatar collage based on the plurality of Facenet comments.

Figure 8:
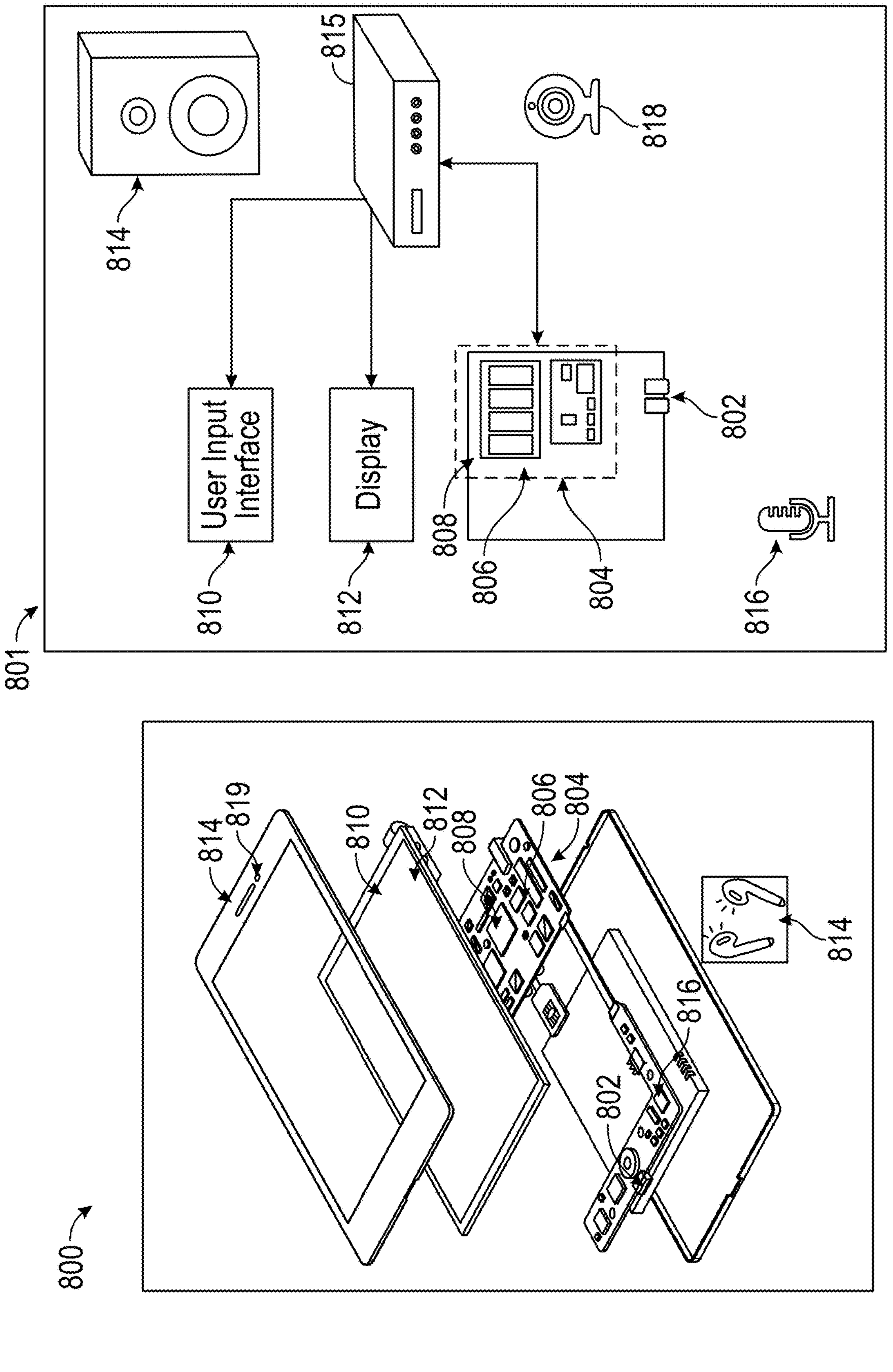
FIG. 8 describes illustrative devices, systems, servers, and related hardware for generating an avatar collage of media items, in accordance with some embodiments of this disclosure.

FIGS. 8-9 describe illustrative devices, systems, servers, and related hardware for providing audio from a live event to a user, in accordance with some embodiments of the present disclosure. FIG. 8 shows generalized embodiments of illustrative user equipment 800 and 801, which may correspond to user equipment (e.g., device 104 and device 108 of FIG. 1); user equipment (e.g., device 216 of FIG. 2B). For example, user equipment 800 may be a smartphone device, a tablet, a near-eye display device, an XR device, or any other suitable device capable of participating in a XR environment, e.g., locally or over a communication network. In another example, user equipment 801 may be a user television equipment system or device. User equipment 801 may include set-top box 815. Set-top box 815 may be communicatively connected to microphone 816, audio output equipment (e.g., speaker or headphones 814), and display 812. In some embodiments, microphone 816 may receive audio corresponding to a voice of a video conference participant and/or ambient audio data during a video conference. In some embodiments, display 812 may be a television display or a computer display. In some embodiments, set-top box 815 may be communicatively connected to user input interface 810. In some embodiments, user input interface 810 may be a remote-control device. Set-top box 815 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user equipment are discussed below in connection with FIG. 9. In some embodiments, device 800 may comprise any suitable number of sensors (e.g., gyroscope or gyrometer, or accelerometer, etc.), and/or a GPS module (e.g., in communication with one or more servers and/or cell towers and/or satellites) to ascertain a location of device 800. In some embodiments, device 800 comprises a rechargeable battery that is configured to provide power to the components of the device.

Each one of user equipment 800 and user equipment 801 may receive content and data via input/output (I/O) path 802. I/O path 802 may provide content (e.g., broadcast programming, on-demand programming, internet content, content available over a local area network (LAN) or wide area network (WAN), and/or other content) and data to control circuitry 804, which may comprise processing circuitry 807 and storage 808. Control circuitry 804 may be used to send and receive commands, requests, and other suitable data using I/O path 802, which may comprise I/O circuitry. I/O path 802 may connect control circuitry 804 to one or more communications paths (described below). I/O functions may be provided by one or more of these communications paths but are shown as a single path in FIG. 8 to avoid overcomplicating the drawing. While set-top box 815 is shown in FIG. 8 for illustration, any suitable computing device having processing circuitry, control circuitry, and storage may be used in accordance with the present disclosure. For example, set-top box 815 may be replaced by, or complemented by, a personal computer (e.g., a notebook, a laptop, a desktop), a smartphone (e.g., device 800), an XR device, a tablet, a network-based server hosting a user-accessible client device, a non-user-owned device, any other suitable device, or any combination thereof.

Control circuitry 804 may be based on any suitable control circuitry such as processing circuitry 807. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i6 processor and an Intel Core i7 processor). In some embodiments, control circuitry 804 executes instructions for the social network application stored in memory (e.g., storage 808). Specifically, control circuitry 804 may be instructed by the social network application to perform the functions discussed above and below. In some implementations, processing or actions performed by control circuitry 804 may be based on instructions received from the social network application.

In client/server-based embodiments, control circuitry 804 may include communications circuitry suitable for communicating with a server or other networks or servers. The social network application may be a stand-alone application implemented on a device or a server. The social network application may be implemented as software or a set of executable instructions. The instructions for performing any of the embodiments discussed herein of the social network application may be encoded on non-transitory computer-readable media (e.g., a hard drive, random-access memory on a DRAM integrated circuit, read-only memory on a BLU-RAY disk, etc.). For example, in FIG. 8, the instructions may be stored in storage 808, and executed by control circuitry 804 of a device 800.

In some embodiments, the social network application may be a client/server application where only the client application resides on device 800, and a server application resides on an external server (e.g., server 904 and/or media content source 902). For example, the social network application may be implemented partially as a client application on control circuitry 804 of device 800 and partially on server 904 as a server application running on control circuitry 911. Server 904 may be a part of a local area network with one or more of devices 800, 801 or may be part of a cloud computing environment accessed via the internet. In a cloud computing environment, various types of computing services for performing searches on the internet or informational databases, providing video communication capabilities, providing storage (e.g., for a database) or parsing data are provided by a collection of network-accessible computing and storage resources (e.g., server 904 and/or an edge computing device), referred to as "the cloud." Device 800 may be a cloud client that relies on the cloud computing capabilities from server 904 to generate personalized engagement options in a VR environment. The client application may instruct control circuitry 804 to generate personalized engagement options in a VR environment.

Control circuitry 804 may include communications circuitry suitable for communicating with a server, edge computing systems and devices, a table or database server, or other networks or servers. The instructions for carrying out the above mentioned functionality may be stored on a server (which is described in more detail in connection with FIG. 9). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the internet or any other suitable communication networks or paths (which is described in more detail in connection with FIG. 9). In addition, communications circuitry may include circuitry that enables peer-to-peer communication of user equipment, or communication of user equipment in locations remote from each other (described in more detail below).

Memory may be an electronic storage device provided as storage 808 that is part of control circuitry 804. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 808 may be used to store various types of content described herein as well as social network application data described above. Nonvolatile memory may also be used (e.g., to launch a boot-up routine and other instructions). Cloud-based storage, described in relation to FIG. 8, may be used to supplement storage 808 or instead of storage 808. Non-transitory memory may store instructions that when executed by control circuitry, I/O circuitry, any other suitable circuitry or combination thereof, executes functions of a social network application as described above.

Control circuitry 804 may include video generating circuitry and tuning circuitry, such as one or more analog tuners, one or more MPEG-2 decoders or MPEG-2 decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 804 may also include scaler circuitry for upconverting and downconverting content into the preferred output format of user equipment 800. Control circuitry 804 may also include digital-to-analog converter circuitry and analog-to-digital converter circuitry for converting between digital and analog signals. The tuning and encoding circuitry may be used by user equipment 800, 801 to receive and to display, to play, or to record content. The tuning and encoding circuitry may also be used to receive video communication session data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 808 is provided as a separate device from user equipment 800, the tuning and encoding circuitry (including multiple tuners) may be associated with storage 808.

Control circuitry 804 may receive instruction from a user by way of user input interface 810. User input interface 810 may be any suitable user interface, such as a remote control, mouse, trackball, keypad, keyboard, touch screen, touchpad, stylus input, joystick, voice recognition interface, or other user input interfaces. Display 812 may be provided as a stand-alone device or integrated with other elements of each one of user equipment 800 and user equipment 801. For example, display 812 may be a touchscreen or touch-sensitive display. In such circumstances, user input interface 810 may be integrated with or combined with display 812. In some embodiments, user input interface 810 includes a remote-control device having one or more microphones, buttons, keypads, any other components configured to receive user input or combinations thereof. For example, user input interface 810 may include a handheld remote-control device having an alphanumeric keypad and option buttons. In a further example, user input interface 810 may include a handheld remote-control device having a microphone and control circuitry configured to receive and identify voice commands and transmit information to set-top box 815.

Audio output equipment 814 may be integrated with or combined with display 812. Display 812 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 812. Audio output equipment 814 may be provided as integrated with other elements of each one of device 800 and device 801 or may be stand-alone units. An audio component of videos and other content displayed on display 812 may be played through speakers (or headphones) of audio output equipment 814. In some embodiments, audio may be distributed to a receiver (not shown), which processes and outputs the audio via speakers of audio output equipment 814. In some embodiments, for example, control circuitry 804 is configured to provide audio cues to a user, or other audio feedback to a user, using speakers of audio output equipment 814. There may be a separate microphone 816 or audio output equipment 814 may include a microphone configured to receive audio input such as voice commands or speech. For example, a user may speak letters or words that are received by the microphone and converted to text by control circuitry 804. In a further example, a user may voice commands that are received by a microphone and recognized by control circuitry 804. Camera 818 may be any suitable video camera integrated with the equipment or externally connected. Camera 818 may be a digital camera comprising a charge-coupled device (CCD) and/or a complementary metal-oxide semiconductor (CMOS) image sensor. Camera 818 may be an analog camera that converts to digital images via a video card.

The social network application may be implemented using any suitable architecture. For example, it may be a stand-alone social network application wholly implemented on each one of user equipment 800 and user equipment 801. In such an approach, instructions of the social network application may be stored locally (e.g., in storage 808), and data for use by the application is downloaded on a periodic basis (e.g., from an out-of-band feed, from an internet resource, or using another suitable approach). Control circuitry 804 may retrieve instructions of the social network application from storage 808 and process the instructions to provide video conferencing functionality and generate any of the displays discussed herein. Based on the processed instructions, control circuitry 804 may determine what action to perform when input is received from user input interface 810. For example, movement of a cursor on a display up/down may be indicated by the processed instructions when user input interface 810 indicates that an up/down button was selected. A social network application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 804 may allow a user to provide user profile information or may automatically compile user profile information. For example, control circuitry 804 may access and monitor network data, video data, audio data, processing data, participation data from a conference participant profile. Control circuitry 804 may obtain all or part of other user profiles that are related to a particular user (e.g., via social media networks), and/or obtain information about the user from other sources that control circuitry 804 may access. As a result, a user can be provided with a unified experience across the user's different devices.

In some embodiments, the social network application is a client/server-based application. Data for use by a thick or thin client implemented on each one of user equipment 800 and user equipment 801 may be retrieved on-demand by issuing requests to a server remote to each one of user equipment 800 and user equipment 801. For example, the remote server may store the instructions for the social network application in a storage device. The remote server may process the stored instructions using circuitry (e.g., control circuitry 804) and generate the displays discussed above and below. The client device may receive the displays generated by the remote server and may display the content of the displays locally on device 800. This way, the processing of the instructions is performed remotely by the server while the resulting displays (e.g., that may include text, a keyboard, or other visuals) are provided locally on device 800. Device 800 may receive inputs from the user via input interface 810 and transmit those inputs to the remote server for processing and generating the corresponding displays. For example, device 800 may transmit a communication to the remote server indicating that an up/down button was selected via input interface 810. The remote server may process instructions in accordance with that input and generate a display of the social network application corresponding to the input (e.g., a display that moves a cursor up/down). The generated display is then transmitted to device 800 for presentation to the user.

In some embodiments, the social network application may be downloaded and interpreted or otherwise run by an interpreter or virtual machine (run by control circuitry 804). In some embodiments, the social network application may be encoded in the ETV Binary Interchange Format (EBIF), received by control circuitry 804 as part of a suitable feed, and interpreted by a user agent running on control circuitry 804. For example, the social network application may be an EBIF application. In some embodiments, the social network application may be defined by a series of JAVA-based files that are received and run by a local virtual machine or other suitable middleware executed by control circuitry 804. In some of such embodiments (e.g., those employing MPEG-2, MPEG-4, HEVC or any other suitable digital media encoding schemes), the social network application may be, for example, encoded and transmitted in an MPEG-2 object carousel with the MPEG audio and video packets of a program.

As shown in FIG. 9, user equipment 906, 907, 908, 910 (which may correspond to user equipment (e.g., device 104 and device 108 of FIG. 1; device 216 of FIG. 2B) may be coupled to communication network 909. Communication network 909 may be one or more networks including the internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 909) may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 9 to avoid overcomplicating the drawing.

Although communications paths are not drawn between user equipment, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment may also communicate with each other directly through an indirect path via communication network 909.

System 900 may comprise media content source 902, one or more servers 904, and/or one or more edge computing devices. In some embodiments, the social network application may be executed at one or more of control circuitry 911 of server 904 (and/or control circuitry of user equipment 906, 907, 908, 910 and/or control circuitry of one or more edge computing devices). In some embodiments, the media content source and/or server 904 may be configured to host or otherwise facilitate video communication sessions between user equipment 906, 907, 908, 910 and/or any other suitable user equipment, and/or host or otherwise be in communication (e.g., over network 909) with one or more social network services.

In some embodiments, server 904 may include control circuitry 911 and storage 914 (e.g., RAM, ROM, Hard Disk, Removable Disk, etc.). Storage 914 may store one or more databases. Server 904 may also include an I/O path 912. In some embodiments, I/O path 912 is an I/O circuitry. I/O circuitry may be a NIC card, audio output device, mouse, keyboard card, any other suitable I/O circuitry device or combination thereof. I/O path 912 may provide video conferencing data, device information, or other data, over a local area network (LAN) or wide area network (WAN), and/or other content and data to control circuitry 911, which may include processing circuitry, and storage 914. Control circuitry 911 may be used to send and receive commands, requests, and other suitable data using I/O path 912, which may comprise I/O circuitry. I/O path 912 may connect control circuitry 911 (and specifically control circuitry) to one or more communications paths.

Control circuitry 911 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 911 may be distributed across multiple separate processors or processing units, for example, multiple of the same type of processing units (e.g., two Intel Core i7 processors) or multiple different processors (e.g., an Intel Core i6 processor and an Intel Core i7 processor). In some embodiments, control circuitry 911 executes instructions for an emulation system application stored in memory (e.g., the storage 914). Memory may be an electronic storage device provided as storage 914 that is part of control circuitry 911. Memory may store instruction to run a social network application.

Figure 10:
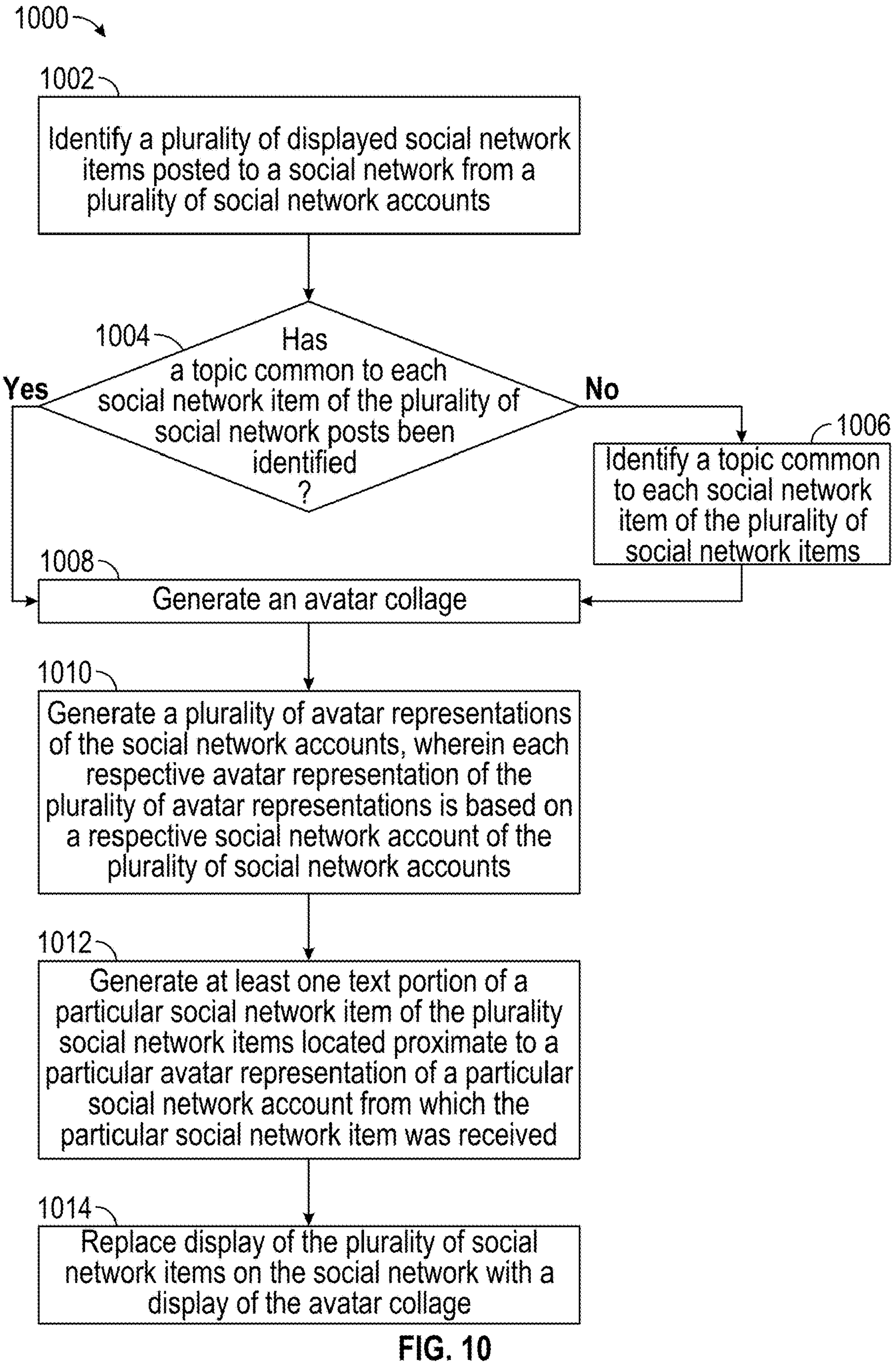
FIG. 10 is a flowchart of an illustrative process for generating an avatar collage based on social network items, in accordance with some embodiments of this disclosure.

FIG. 10 is a flowchart of a detailed illustrative process 1000 for generating an avatar collage based on social network items, in accordance with some embodiments of this disclosure. In various embodiments, the individual steps of process 1000 may be implemented by one or more components of the devices and systems of FIGS. 2A-2B and FIGS. 8-9 and may be performed in combination with any of the other processes and aspects described herein. Although the present disclosure may describe certain steps of process 1000 (and of other processes described herein) as being implemented by certain components of the devices and systems of FIGS. 2A-2B and FIGS. 8-9, this is for purposes of illustration only. It should be understood that other suitable components of the devices and systems may implement those steps instead.

In some embodiments, at step 1002, control circuitry (e.g., control circuitry 804 of user equipment 800, and/or control circuitry 911 of server 904) identifies a plurality of social network items from a plurality of social network accounts. The plurality of social network items is generated for display via I/O circuitry (e.g., I/O circuitry 802 of FIG. 8) at a display screen of a device (e.g., device 202 of FIG. 2A). For example, the control circuitry generates for display the plurality of social network items 116 (e.g., Facenet comments) on a laptop accessing a social network application (e.g., Facenet). Control circuitry 804 generates Facenet comments posted by Facenet accounts associated with users called John, Ritika, Arnab, and Jagat. In some embodiments, the plurality of social network items are posted in response to an initial social network item, e.g., initial social network item 114 posted by the Facenet account associated with a user called Amit. In some embodiments, the laptop (e.g., device 202) running the social network application (e.g., Facenet) is logged in to a social network account. For example, the laptop (e.g., device 202) is logged in to the Facenet account associated with a user called Sally.

In some embodiments, at step 1004, the control circuitry determines whether a topic common to each social network item of the plurality of social network items has been identified. At step 1006, the control circuitry determines that a topic common to each social network item of the plurality of social network items has not yet been identified. At step 1006, the control circuitry identifies a topic common to each social network item of the plurality of social network items. In some embodiments, the control circuitry semantically and contextually analyzes each social network item to determine the common topic. In some embodiments, a neural network, e.g., neural network 108, determines the common topic. For example, control circuitry 804 uses neural network 108 to determine that the topic common to the plurality of social network items 116 is Amit's birthday.

In some approaches, at step 1008, in response to determining that a topic common to the plurality of social network items has been determined, the control circuitry generates an avatar collage. In some embodiments, the control circuitry generates the avatar collage by generating a plurality of avatar representations and generating at least one portion of text. At step 1010, the control circuitry generates a plurality of avatar representations of the social network accounts, wherein each respective avatar representation of the plurality of avatar representations is based on a respective social network account of the plurality of social network accounts. In some embodiments, each avatar representation of the plurality of avatar representations based on a tone of each of the plurality of social network items and data from each respective social network account, as described above in connection with FIGS. 1A-1B. For example, control circuitry 804 semantically analyzes the Facenet item posted by the Facenet account associated with the user called Ritika. Control circuitry 804 determines what the user called Ritika looks like by analyzing photos posted to her Facenet account. Control circuitry 804 generates an avatar representation of the Facenet account associated with the user called Ritika based on the determined tone and Facenet account data.

In some approaches, at step 1012, the control circuitry generates at least one text portion of a particular social network item of the plurality social network items located proximate to a particular avatar representation of a particular social network account from which the particular social network item was received. In some embodiments, the control circuitry determines the particular social network item by determining that the particular social network account has the smallest degree of separation from the social network account accessing the social network, as described above in connection with FIGS. 1A-1B. For example, the laptop (e.g., device 202) is logged in to the Facenet account associated with a user called Sally. Control circuitry 804 determines, via analyzing data of her Facenet account, that Sally is good friends, e.g., has a smallest degree of separation, with the Facenet account associated with the user called John. Thus, control circuitry 804 generates, proximate to the avatar representation of the Facenet account associated with the user called John, at least one text portion of the Facenet comment posted by the Facenet account associated with the user called John.

In some embodiments, the control circuitry generates the at least one text portion of the particular social network for a first period of time and an at least one text portion of another social network item for a second period of time, as described above in connection with FIGS. 1A-1B. For example, control circuitry 804 generates text 126 for five seconds, then generates text from the Facenet item posted by the Facenet account associated with Ritika for five seconds. In some embodiments, the first period of time is the same duration as the second period of time. In some embodiments, the control circuitry generates at least one text portion of a social network item in response to receiving a user interface interaction at the portion of the device screen displaying a respective avatar representation, as described above in connection with FIGS. 2A-2B.

In some implementations, at step 1014, the control circuitry replaces display of the plurality of social network items on the social network with a display of the avatar collage via the I/O circuitry. The avatar collage may be a JPEG file, GIF file, PNG file, PDF file, any other suitable image file type, or any combination thereof. For example, control circuitry 804 replaces display of the plurality of social network items 116 with display of avatar collage 136, as described above in connection with FIGS. 1A-1B. In some embodiments, the control circuitry replaces the display of the plurality of social network items with the display of the avatar collage in response to receiving a user interface selection of a user interface option, as described above in connection with FIG. 3.

Figure 11:
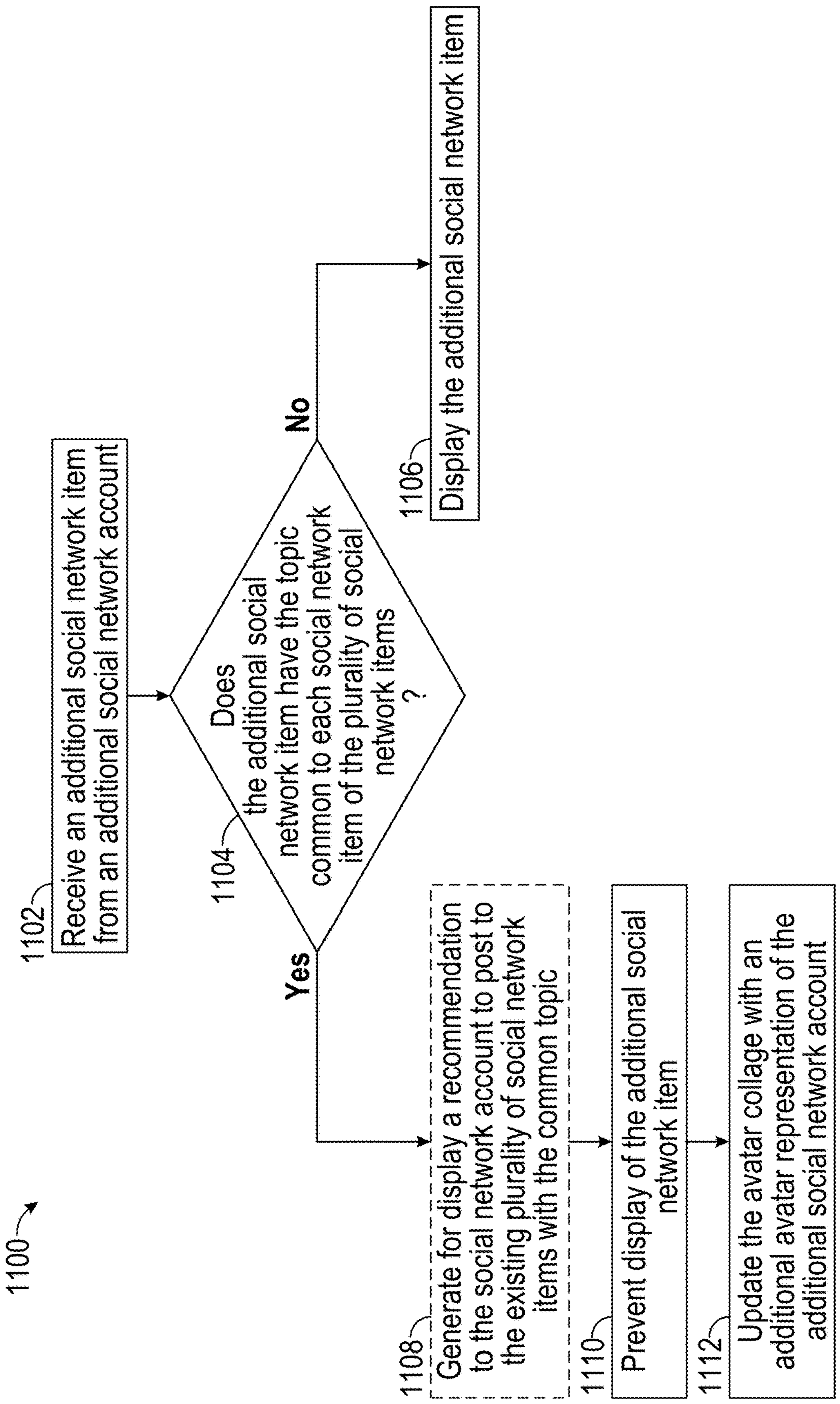
FIG. 11 is a flowchart of an illustrative process for updating an avatar collage based on receiving an additional social network item, in accordance with some embodiments of this disclosure.

FIG. 11 is a flowchart of a detailed illustrative process 1100 for updating an avatar collage based on receiving an additional social network item, in accordance with some embodiments of this disclosure. In various embodiments, the individual steps of process 1100 may be implemented by one or more components of the devices and systems of FIGS. 2A-2B and FIGS. 8-9 and may be performed in combination with any of the other processes and aspects described herein. Although the present disclosure may describe certain steps of process 1100 (and of other processes described herein) as being implemented by certain components of the devices and systems of FIGS. 2A-2B and FIGS. 8-9, this is for purposes of illustration only. It should be understood that other suitable components of the devices and systems may implement those steps instead.

In some embodiments, at step 1102, the control circuitry (e.g., control circuitry 804 of user equipment 800, and/or control circuitry 911 of server 904) receives an additional social network item from an additional social network account. In some embodiments, the control circuitry receives the additional social network item from a user interface interaction at a device displaying the plurality of social network items. For example, server 904 receives a Facenet post, written by a Facenet account associated with a user called Tim, posted to the thread of the plurality of social network items 116 corresponding to initial social network item 114. In some embodiments, the control circuitry receives the additional social network item from a user interface interaction at a device displaying the avatar collage. For example, server 904 receives a Facenet post, written by a Facenet account associated with a user called Tim, posted to avatar collage 136. At step 1104, the control circuitry determines whether the additional social network item has the topic common to the plurality of social network items. At step 1106, the control circuitry determines that the additional social network item does not have the topic common to the plurality of social network items. For example, control circuitry 804 determines, using the analysis described above in connection with FIGS. 1A-1B and FIG.

10, that the Facenet post written by the Facenet account associated with the user called Tim has a topic related to Christmas.

In some approaches, at step 1106, the control circuitry displays the additional social network item via I/O circuitry (e.g., I/O circuitry 802 of FIG. 8) at a display screen of a device (e.g., device 202 of FIG. 2A). For example, control circuitry 804 generates for display, via I/O circuitry 802, the Facenet post written by the Facenet account associated with the user called Tim at the laptop accessing Facenet, separately from the plurality of Facenet comments related to Amit's birthday.

In some embodiments, at step 1108, the control circuitry determines that the additional social network item has the topic common to the plurality of social network items. For example, control circuitry 804 determines, using the analysis described above in connection with FIGS. 1A-1B and FIG. 10, that the Facenet post written by the Facenet account associated with the user called Tim has the topic Amit's birthday. At step 1108, in some embodiments, the control circuitry generates for display, via the I/O circuitry, a recommendation to the social network account to post to the existing plurality of social network items with the common topic, as described above in connection with FIGS. 1A-1B. For example, control circuitry 804, via I/O circuitry 802, generates for display a notification on a screen of a device logged in to the Facenet account associated with the user called Tim that says "A thread for Amit's Birthday already exists. Select 'Yes' to post your birthday message to the thread. Select 'No' to post your birthday message separately from the thread." In some embodiments, the control circuitry receives a user interface selection of the user interface option to post to an existing thread.

In some embodiments, at step 1100, the control circuitry prevents display of the additional social network item. For example, rather than generating for display the Facenet post written by the Facenet account associated with the user called Tim, control circuitry 804 generates an avatar representation of the Facenet account associated with the user called Tim using the techniques described above in connection with FIGS. 1A-1B and FIG. 10.

In some approaches, at step 1112, the control circuitry updates the avatar collage with an additional avatar representation of the additional social network account. For example, control circuitry 804 updates avatar collage 136 by adding to the avatar collage the avatar representation of the Facenet account associated with the user called Tim. In some embodiments, the control circuitry rearranges the plurality of avatar representations to accommodate the additional avatar representation.

Figure 12:
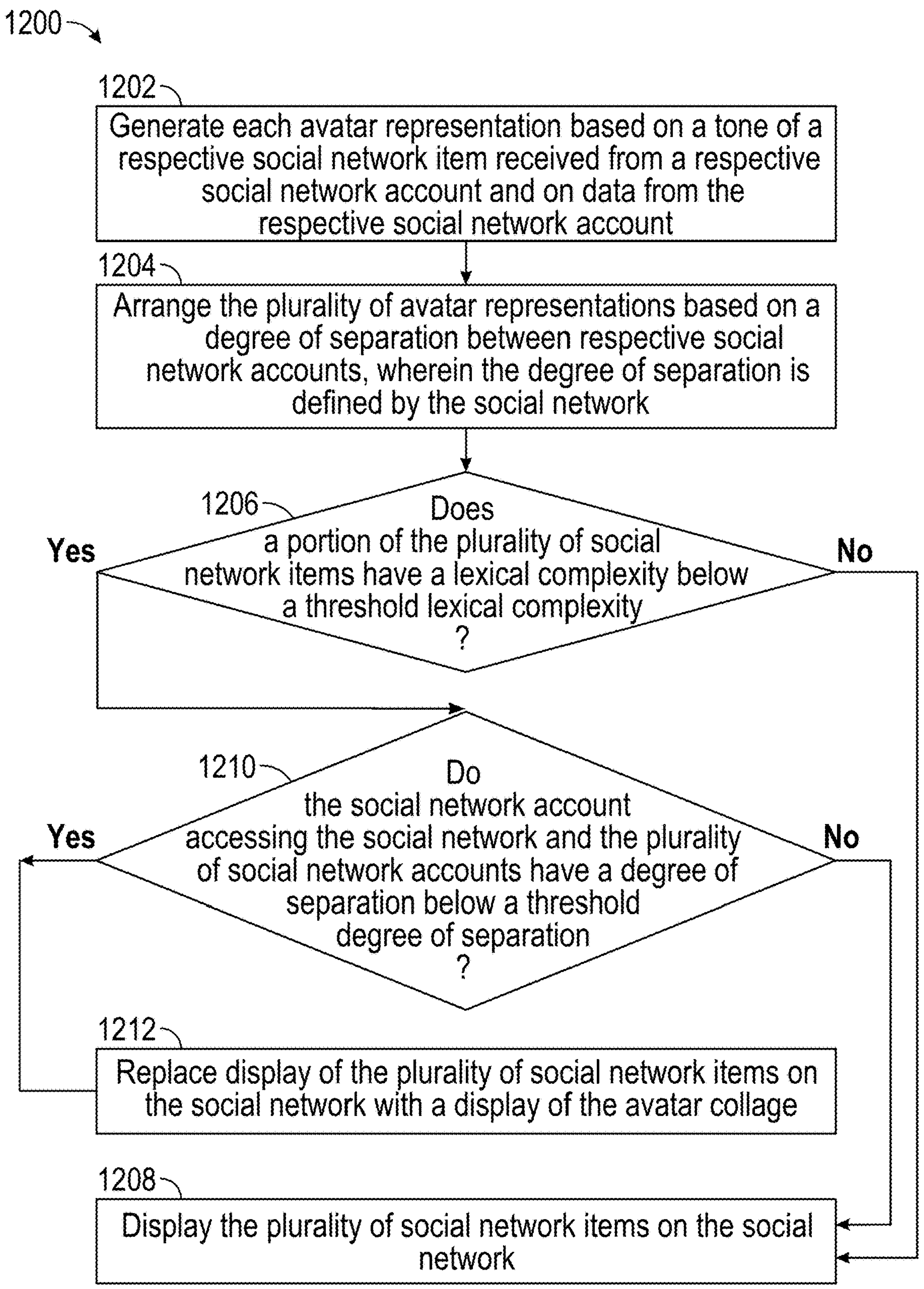
FIG. 12 is a flowchart of an illustrative process for replacing the display of a plurality of social network items with a display of an avatar collage based on the plurality of social network items, in accordance with some embodiments of this disclosure.

FIG. 12 is a flowchart of a detailed illustrative process 1200 for replacing the display of a plurality of social network items with a display of an avatar collage based on the plurality of social network items, in accordance with some embodiments of this disclosure. In various embodiments, the individual steps of process 1200 may be implemented by one or more components of the devices and systems of FIGS. 2A-2B and FIGS. 8-9 and may be performed in combination with any of the other processes and aspects described herein. Although the present disclosure may describe certain steps of process 1200 (and of other processes described herein) as being implemented by certain components of the devices and systems of FIGS. 2A-2B and FIGS. 8-9, this is for purposes of illustration only. It should be understood that other suitable components of the devices and systems may implement those steps instead.

In some embodiments, at step 1202, control circuitry (e.g., control circuitry 804 of user equipment 800, and/or control circuitry 911 of server 904) generates each avatar representation based on a tone of a respective social network item received from a respective social network account and on data from the respective social network account. For example, control circuitry 804 generates an avatar representation of the Facenet accounts associated with the users called John, Ritika, Arnab, and Jagat, as described above in connection with FIGS. 1A-1B and FIG. 10.

In some implementations, at step 1204, the control circuitry arranges the plurality of avatar representations based on a degree of separation between the respective social network accounts, wherein the degree of separation is defined by the social network. For example, control circuitry 804 arranges the avatar representations based on the Facenet accounts associated with Ritika and Amit directly next to each other because control circuitry 804 determines that the Facenet account associated with Ritika has the smallest degree of separation from the Facenet account associated with Amit, as described above in connection with FIGS. 1A-1B. In some embodiments, the control circuitry arranges the plurality of avatar representations in a grid along with callout balloons of portions of text, as described above in connection with FIG. 5.

In some approaches, at step 1206, the control circuitry determines whether a portion of the plurality of the social network items has a lexical complexity below a threshold lexical complexity. In some embodiments, the control circuitry determines the lexical complexity of each social network item of the plurality of social network items 116 via a neural network, e.g., neural network 108, as described above in connection with FIGS. 1A-1B. In some embodiments, the control circuitry determines the lexical complexity of each social network item of the plurality of social network items 116 via semantic and contextual analysis, as described above in connection with FIG. 1.

In some approaches, at step 1206, the control circuitry determines that all of the plurality of the social network items have a lexical complexity above a threshold lexical complexity. In response, at step 1208, the control circuitry displays, via I/O circuitry (e.g., I/O circuitry 802 of FIG. 8) at a display screen of a device (e.g., device 202 of FIG. 2A) the plurality of social network items. For example, control circuitry 804 determines via neural network 108 that the plurality of social network items 116 are all above a threshold lexical complexity. Thus, control circuitry 804, via I/O circuitry 802, displays the plurality of social network items 116 and does not proceed to generating an avatar collage.

In some embodiments, at step 1210, the control circuitry determines whether the social network account accessing the social network and the plurality of social network accounts has a degree of separation below a threshold degree of separation. In some embodiments, the control circuitry determines a degree of separation between the social network account and at least one of the social network accounts of the plurality of social network accounts by analyzing data of the social network account accessing the social network. For example, control circuitry 804 determines that the Facenet account associated with the user called Sally has a degree of separation below a threshold degree of separation from the Facenet account associated with the user called Ritika. In some approaches, control circuitry 804 determines the degree of separation by determining that the Facenet accounts associated with the users called Ritika and Sally both follow each other and that each of the Facenet accounts has posted photos of users identified as Ritika and Sally.

In some approaches, at step 1212, the control circuitry, via the I/O circuitry, replaces display of the plurality of social network items with a display of the avatar collage. The avatar collage may be a JPEG file, GIF file, PNG file, PDF file, any other suitable image file type, or any combination thereof. For example, control circuitry 804 replaces display of the plurality of social network items 116 with display of avatar collage 136, as described above in connection with FIGS. 1A-1B. In some embodiments, the control circuitry replaces the display of the plurality of social network items with the display of the avatar collage in response to receiving a user interface selection of a user interface option, as described above in connection with FIG. 3.

Figure 13:
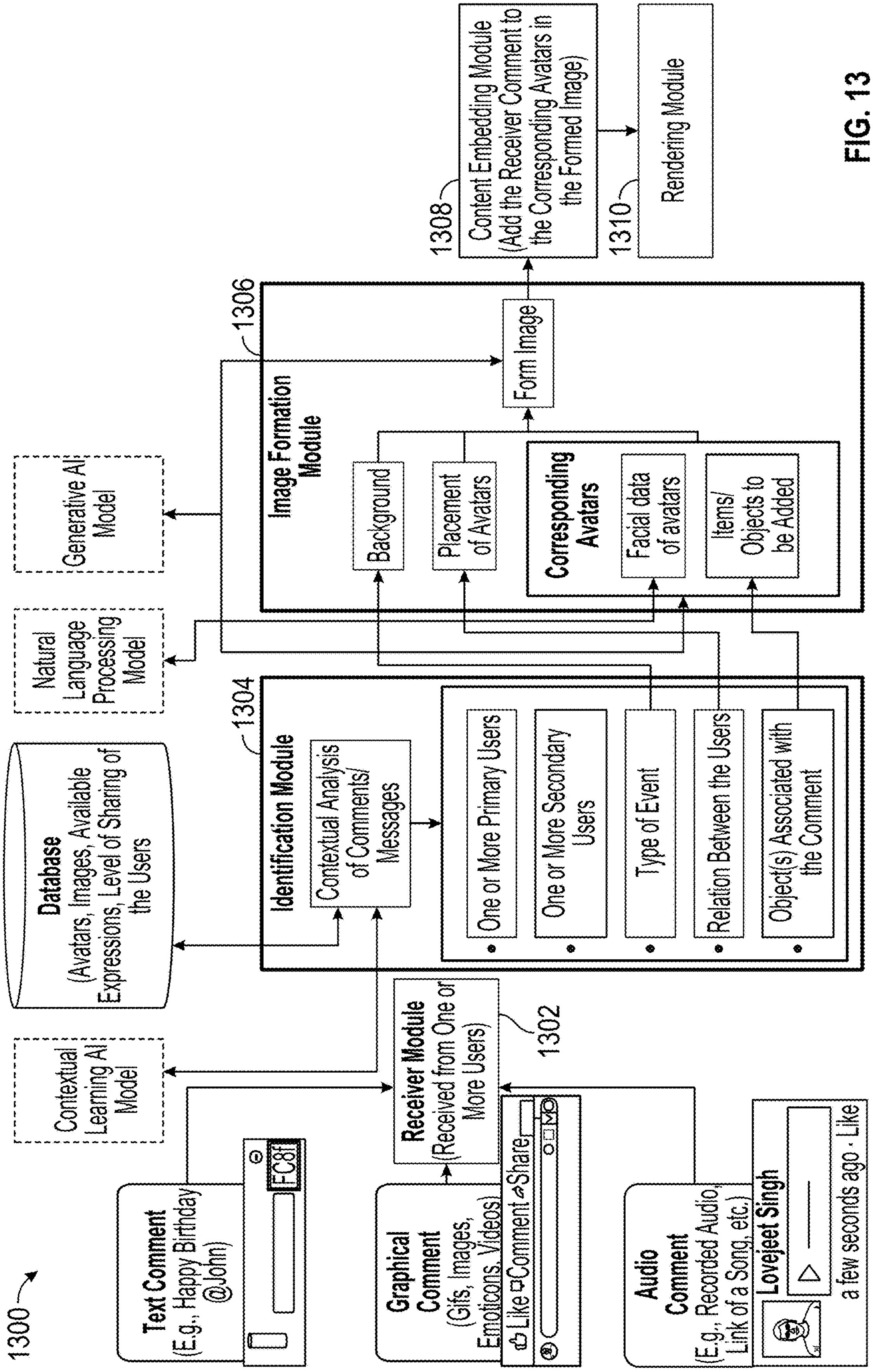
FIG. 13 is a flowchart of an illustrative process for generating an avatar collage based on social network items, in accordance with some embodiments of this disclosure.

FIG. 13 is a flowchart of a detailed illustrative process 1300 for rendering an avatar collage based on social network items, in accordance with some embodiments of this disclosure. In various embodiments, the individual steps of process 1300 may be implemented by one or more components of the devices and systems of FIGS. 2A-2B and FIGS. 8-9 and may be performed in combination with any of the other processes and aspects described herein. Although the present disclosure may describe certain steps of process 1300 (and of other processes described herein) as being implemented by certain components of the devices and systems of FIGS. 2A-2B and FIGS. 8-9, this is for purposes of illustration only. It should be understood that other suitable components of the devices and systems may implement those steps instead. In some embodiments, an identification module uses information from a database or a contextual learning AI model to perform identification. In some embodiments, an image formation module uses a natural language processing model or a generative AI model to perform image formation.

In some embodiments, at step 1302, a receiver module receives a plurality of types of social network items. The plurality of social network items are text comments, graphical comments, audio comments, any other suitable content type, or any combination thereof. In some approaches, a receiver module performs step 1002 as described above in connection with FIG. 10. In some approaches, a receiver module performs step 1102 as described above in connection with FIG. 11. For example, a receiver module receives a plurality of social network items 116. In some embodiments, a receiver module receives a user interface selection of a security setting indicating whether a user has authorized the social network to display their name and/or photographs to all social network accounts accessing the social network.

In some approaches, at step 1304, an identification module contextually analyzes the plurality of social network items. In some embodiments, the identification module identifies one or more primary social network accounts associated with one or more primary users. For example, the identification module determines that a topic common to the plurality of social network items 116 is the birthday of a primary Facenet account associated with a primary user called Amit using the techniques described above in connection with FIGS. 1A-1B and FIG. 10. At step 1304, the identification module may also identify one or more secondary users. For example, for the plurality of social network items 116, the identification module identifies the plurality of secondary Facenet accounts associated with the second users John, Ritika, Arnab, and Jagat.

In some embodiments, the identification module identifies relationships between social network accounts. For example, the identification module determines a degree of separation between two Facenet accounts. In some embodiments, the identification module identifies an object associated with a social network item of the plurality of social network items. For example, the identification module identifies a stein of beer is an object associated with one of the plurality of social network items 116, as described above in connection with FIG. 4.

In some implementations, at step 1306, an image formation module uses information from a database to generate a plurality of avatar representations based on the plurality of social network accounts that posted the plurality of social network items. In some embodiments, the image formation module generates a background for an avatar collage based on the identified topic. In some implementations, the image formation module arranges the avatar representations based on the relationship between the plurality of social network accounts. In some approaches, the image formation module generates the plurality of avatar representations using facial data and generates depictions of objects identified by the identification module.

In some embodiments, at step 1308, a content embedding module embeds the respective content of each social network item of the plurality of social network items in the corresponding avatar representation of the avatar collage. For example, the text of a Facenet comment appears when control circuitry (e.g., control circuitry 804 of user equipment 800, and/or control circuitry 911 of server 904) receives a user interface interaction at a portion of the screen of a device that is displaying the avatar representation corresponding to the Facenet comment, as described above in connection to FIGS. 2A-2B. At step 1310, a rendering module generates for display, at a device accessing the social network, the avatar collage.

Figure 14:
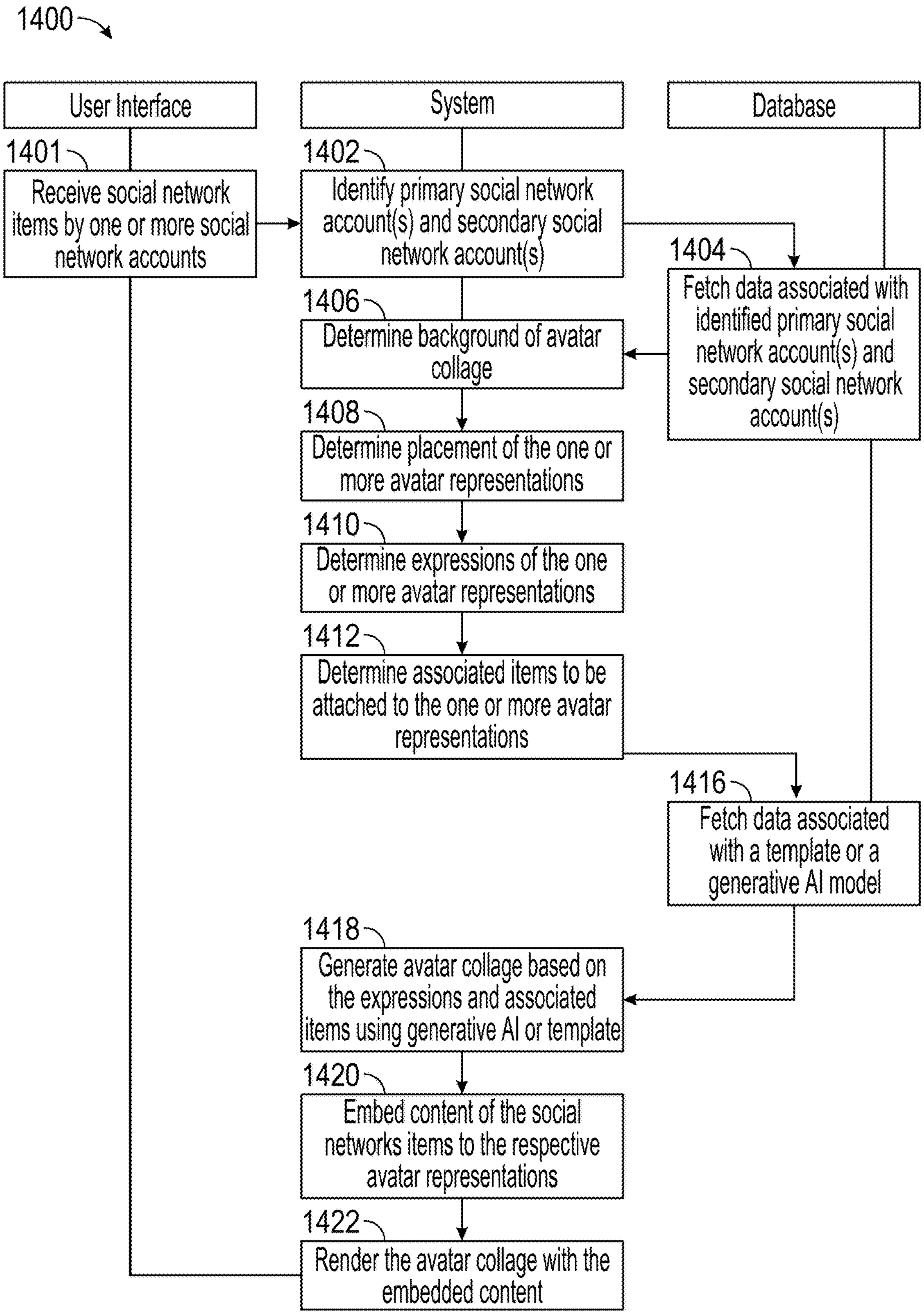
FIG. 14 is a flowchart of an illustrative process for generating an avatar collage based on social network items, in accordance with some embodiments of this disclosure.

FIG. 14 is a flowchart of a detailed illustrative process 1400 for rendering an avatar collage based on social network items, in accordance with some embodiments of this disclosure. In various embodiments, the individual steps of process 1400 may be implemented by one or more components of the devices and systems of FIGS. 2A-2B and FIGS. 8-9 and may be performed in combination with any of the other processes and aspects described herein. Although the present disclosure may describe certain steps of process 1400 (and of other processes described herein) as being implemented by certain components of the devices and systems of FIGS. 2A-2B and FIGS. 8-9, this is for purposes of illustration only. It should be understood that other suitable components of the devices and systems may implement those steps instead.

In some approaches, at step 1401, control circuitry (e.g., control circuitry 804 of user equipment 800, and/or control circuitry 911 of server 904) receives one or more social network items posted by one or more social network accounts, as described above in connection with FIGS. 1A-1B and FIG. 13. In some embodiments, the one or more social network items are received from a user interface of a device accessing a social network. At steps 1402-1420, the control circuitry, e.g., control circuitry 804, performs the steps described above in connection with the identification module, the image formation module, and the content embedding module of FIG. 13. At step 1422, the control circuitry renders the avatar collage with the embedded content at the display of a device accessing the social network. For example, control circuitry 804, via I/O circuitry 802, generates for display avatar collage 136 and at least one text portion of a particular Facenet comment of the plurality of social network items 116, as described above in connection with FIG. 1.

Figure 15:
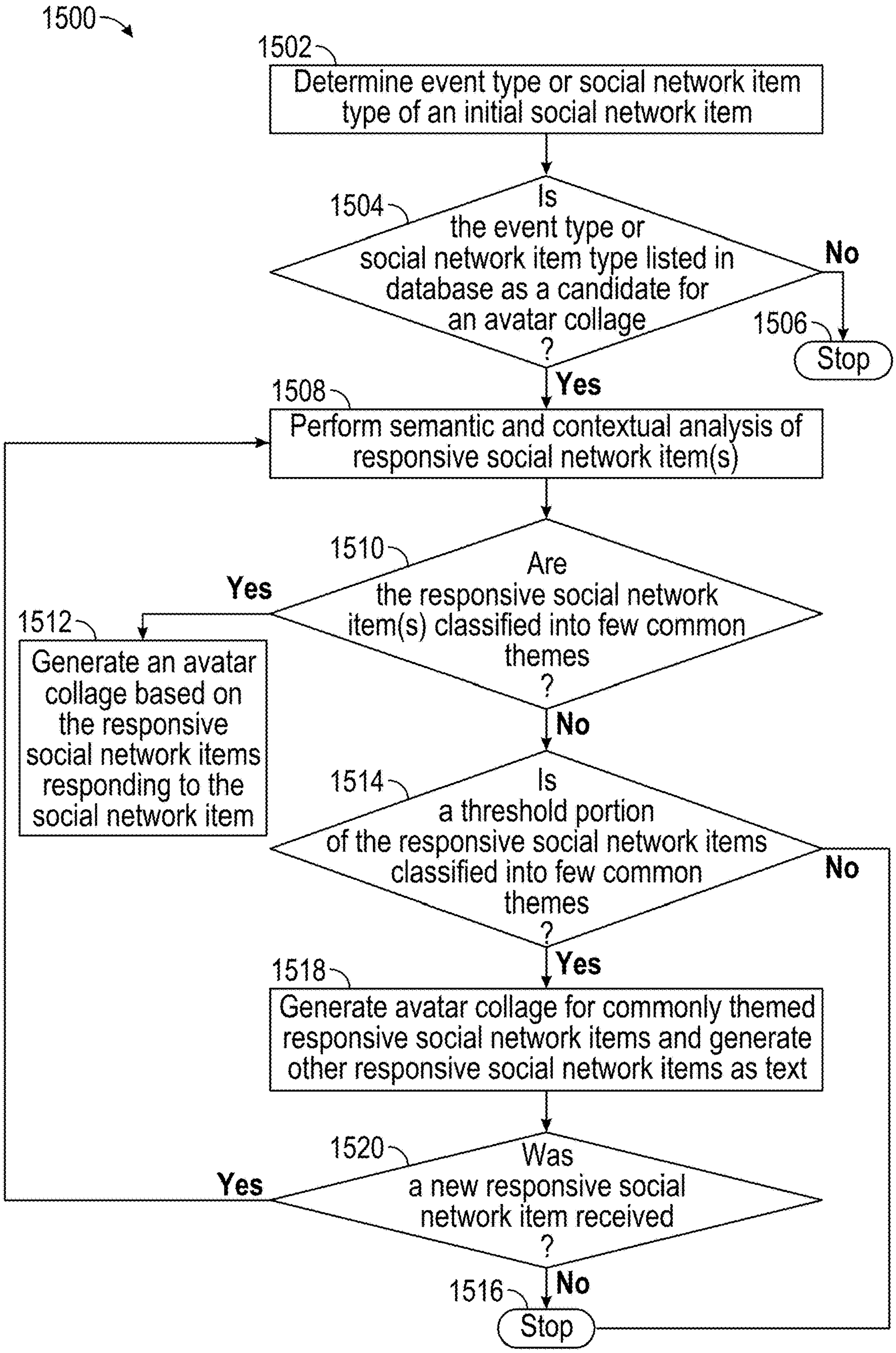
FIG. 15 is a flowchart of a detailed illustrative process for generating an avatar collage using information received from a user interface and from a database, in accordance with some embodiments of this disclosure.

FIG. 15 is a flowchart of a detailed illustrative process 1500 for generating an avatar collage using information received from a user interface and from a database, in accordance with some embodiments of this disclosure. In various embodiments, the individual steps of process 1500 may be implemented by one or more components of the devices and systems of FIGS. 2A-2B and FIGS. 8-9 and may be performed in combination with any of the other processes and aspects described herein. Although the present disclosure may describe certain steps of process 1500 (and of other processes described herein) as being implemented by certain components of the devices and systems of FIGS. 2A-2B and FIGS. 8-9, this is for purposes of illustration only. It should be understood that other suitable components of the devices and systems may implement those steps instead.

In some embodiments, at step 1502, control circuitry (e.g., control circuitry 804 of user equipment 800, and/or control circuitry 911 of server 904) determines an event type or a social network item type of an initial social network item. In some embodiments, an event type is a topic related to the initial social network item. In some embodiments, a social network item type is a post made to a social network, reply to an initial social network post, repost of an initial social network post, a collaborative post, a status post, any other suitable item, or any combination thereof. For example, control circuitry 804 determines that the plurality of social network items 116 are replies to an initial Facenet post. Control circuitry 804 determines that the initial Facenet post is related to the topic of Amit's birthday.

In some implementations, at step 1504, the control circuitry determines whether the event type of social network item type is listed in a database as a candidate for an avatar collage. In some embodiments, the database is the same database in connection with FIGS. 13-14. If at step 1504, the control circuitry determines that the event type of social network item type is not listed in a database as a candidate for an avatar collage, at step 1506, the process ends. At step 1504, the control circuitry determines that the event type of social network item type is listed in a database as a candidate for an avatar collage. For example, a user's birthday is listed in the list of candidates for an avatar collage, thus control circuitry continues to step 1508.

In some embodiments, at step 1508, the control circuitry performs semantic and contextual analysis of the plurality of social network items that are posted in reply to the initial social network item. For example, control circuitry 804 analyzes the plurality of social network items 116, as described above in connection with FIGS. 1A-1B. In some embodiments, the control circuitry continues to step 1510 in response to determining that at least a portion of the plurality of social network item posted in reply to the initial social network item is below a threshold lexical complexity.

In some approaches, at step 1510, the control circuitry determines whether the responsive social network items are related to a few common themes. In some embodiments, a few common themes are one topic. For example, control circuitry 804 uses techniques described above in connection with FIG. 1 to determine the topic of each of the responsive social network items. At step 1512, the control circuitry determines that the responsive social network items are classified into few common themes. For example, control circuitry 804 determines that the plurality of social network items 116 relate to the theme of Amit's birthday. Thus, at step 1512, the control circuitry generates an avatar collage based on the responsive social network items. In some embodiments, the control circuitry implements the techniques described above in connection with FIG. 1 and FIG. 13 to generate an avatar collage.

In some embodiments, at step 1510, the control circuitry determines that the plurality of responsive social network items is not classified into few common themes. At step 1514, the control circuitry determines whether a threshold portion of the plurality of responsive social network items is classified into few common themes. At step 1514, the control circuitry determines that a threshold portion of the plurality of responsive social network items is not classified into few common themes. Thus, at step 1516, the control circuitry halts.

In some implementations, at step 1514, the control circuitry determines that a threshold portion of the plurality of responsive social network items is classified into few common themes. Thus, at step 1518, the control circuitry generates an avatar collage based on the portion of the responsive social network items with the common theme. In some embodiments, the control circuitry implements the techniques described above in connection with FIG. 1 and FIG. 13 to generate an avatar collage. At step 1520, the control circuitry determines whether a new responsive social network item has been received. If the control circuitry determines that a new responsive social network item has not been received, the control circuitry proceeds to halt at step 1516. If the control circuitry determines that a new responsive social network item has been received, the control circuitry returns to step 1508. In some embodiments, the control circuitry implements the techniques described above in connection with FIG. 11.

What is claimed is:

1. A method for reducing an amount of data displayed via a social network comprising:

identifying a plurality of social network items posted to the social network via a plurality of social network accounts;

in response to identifying a topic common to each social network item of the plurality of social network items:

generating an avatar collage comprising:

a plurality of avatar representations of the social network accounts, wherein each respective avatar representation of the plurality of avatar representations is based on a respective social network account of the plurality of social network accounts; and at least one text portion of a particular social network item of the plurality of social network items located proximate to a particular avatar representation of a particular social network account from which the particular social network item was received, wherein the generating the avatar collage further comprises:

identifying a template of a plurality of templates based at least in part on the topic; and arranging the plurality of avatar representations based on the identified template;

identifying that the topic is related to an identified social network account;

determining that a first subset of the plurality of social network accounts is within a degree of separation from the identified social network account;

based at least in part on the first subset of the plurality of social network accounts being within the degree of separation from the identified social network account, replacing a first portion of the display of the plurality of social network items with a display of the avatar collage, wherein the first portion of the display comprises social network items posted by the first subset of the plurality of social network accounts;

determining that a second subset of the plurality of social network accounts is not within the degree of separation from the identified social network account; and based at least in part on the second subset of the plurality of social network accounts being outside the degree of separation from the identified social network account, maintaining a second portion of the display of the plurality of social network items, wherein the second portion of the display comprises social network items posted by the second subset of the plurality of social network accounts, wherein the degree of separation is defined by the social network.

2. The method of claim 1, wherein the generating the avatar collage further comprises:

receiving a user interface interaction at an avatar representation of the avatar collage; and in response to the receiving, generating at least one respective text portion of a respective social network item of the plurality of social network items located proximate to the avatar representation of a respective social network account from which the respective social network item was received.

3. The method of claim 2, wherein the receiving the user interface interaction further comprises at least one of:

(a) receiving a touch at a portion of a touchscreen displaying the avatar representation on a first device; or (b) receiving a cursor interaction at a portion of a display screen displaying the avatar representation on a second device.

4. The method of claim 1, further comprising:

determining that a portion of the plurality of social network items has a lexical complexity below a threshold lexical complexity, wherein the replacing the display of the plurality of social network items with the display of the avatar collage for the at least one social network account is performed in response to the determining.

5. The method of claim 1, further comprising:

receiving an additional social network item from an additional social network account;

in response to determining that the additional social network item has the topic common to each social network item of the plurality of social network items:

preventing display of the additional social network item, and updating the avatar collage with an additional avatar representation of the additional social network account.

6. The method of claim 1, wherein the generating the avatar collage further comprises:

determining that the particular social network account of the plurality of social network accounts has a smallest degree of separation from a social network account accessing the social network;

wherein generating the at least one text portion of the particular social network item of the plurality of social network items is performed in response to the determining.

7. The method of claim 1, wherein the generating the at least one text portion of the particular social network item further comprises:

generating the at least one text portion of the particular social network item for a first period of time; and generating another text portion of another social network item of the plurality of social network posts for a second period of time.

8. The method of claim 1, wherein the generating the avatar collage further comprises:

generating each avatar representation of the plurality of avatar representations based on a tone of a respective social network item received from a respective social network account and on data from the respective social network account.

9. The method of claim 1, further comprising:

generating for display a user interface option to replace the display of the avatar collage with the first portion of the display of the plurality of social network items; and in response to receiving a user interface selection of the user interface option:

replacing the display of the avatar collage with the first portion of the display of the plurality of social network items.

10. The method of claim 9, wherein the user interface selection is a first user interface selection, further comprising:

in response to receiving a second user interface selection of the user interface option, replacing the first portion of the display of the plurality of social network items with the display of the avatar collage.

11. The method of claim 1, wherein the identifying the topic common to each social network item of the plurality of social network items further comprises:

inputting content from each social network item of the plurality of social network items into a trained neural network; and in response to the inputting, receiving an output of the topic common to each social network item of the plurality of social network items.

12. The method of claim 1, wherein the generating the avatar collage further comprises:

generating a depiction of an object proximate to the plurality of avatar representations, wherein the object is referenced in at least one text portion of a social network item of the plurality of social network items.

13. A system for reducing an amount of data displayed via a social network comprising:

control circuitry configured to:

identify a plurality of social network items posted to the social network via a plurality of social network accounts;

in response to identifying a topic common to each social network item of the plurality of social network items:

generate an avatar collage comprising:

a plurality of avatar representations of the social network accounts, wherein each respective avatar representation of the plurality of avatar representations is based on a respective social network account of the plurality of social network accounts; and at least one text portion of a particular social network item of the plurality of social network items located proximate to a particular avatar representation of a particular social network account from which the particular social network item was received, wherein the generating the avatar collage further comprises:

identifying a template of a plurality of templates based at least in part on the topic; and arranging the plurality of avatar representations based on the identified template;

identify that the topic is related to an identified social network account;

determine whether a subset of the plurality of social network accounts is within a degree of separation from the identified social network account;

input/output circuitry configured to:

based at least in part on the subset of the plurality of social network accounts being within the degree of separation from the identified social network account, replace a portion of the display of the plurality of social network items with a display of the avatar collage, wherein the portion of the display comprises social network items posted by the subset of the plurality of social network accounts;

based at least in part on the subset of the plurality of social network accounts not being within the degree of separation from the identified social network account, refraining from replacing the portion of the display of the plurality of social network items.

14. The system of claim 13, wherein the control circuitry is further configured to generate the avatar collage by:

receiving a user interface interaction at an avatar representation of the avatar collage; and in response to the receiving, generating at least one respective text portion of a respective social network item of the plurality of social network items located proximate to the avatar representation of a respective social network account from which the respective social network item was received.

15. The system of claim 14, wherein the control circuitry is further configured to receive the user interface interaction by at least one of:

(a) receiving a touch at a portion of a touchscreen displaying the avatar representation on a first device; or (b) receiving a cursor interaction at a portion of a display screen displaying the avatar representation on a second device.

16. A system comprising:

means for identifying a plurality of social network items posted to the social network via a plurality of social network accounts;

means for in response to identifying a topic common to each social network item of the plurality of social network items:

using means for generating an avatar collage comprising:

a plurality of avatar representations of the social network accounts, wherein each respective avatar representation of the plurality of avatar representations is based on a respective social network account of the plurality of social network accounts; and at least one text portion of a particular social network item of the plurality of social network items located proximate to a particular avatar representation of a particular social network account from which the particular social network item was received, wherein the means for generating the avatar collage further comprise:

means for identifying a template of a plurality of templates based at least in part on the topic; and means for arranging the plurality of avatar representations based on the identified template;

means for identifying that the topic is related to an identified social network account;

means for determining whether a subset of the plurality of social network accounts is within a degree of separation from the identified social network account;

means for:

based at least in part on the subset of the plurality of social network accounts being within the degree of separation from the identified social network account, means for replacing a portion of the display of the plurality of social network items with a display of the avatar collage, wherein the portion of the display comprises social network items posted by the subset of the plurality of social network accounts, and based at least in part on the subset of the plurality of social network accounts not being within the degree of separation from the identified social network account, refraining from replacing the portion of the display of the plurality of social network items.

* * * * *